United States Patent [19]

Dugan et al.

[11] Patent Number: 4,495,891
[45] Date of Patent: Jan. 29, 1985

[54] METHOD AND APPARATUS FOR REARING AQUATIC ANIMALS

[75] Inventors: Charles Dugan, Goulds; Timothy Dugan, Homestead, both of Fla.

[73] Assignee: Farm Fresh Shrimp Corporation, Fort Lauderdale, Fla.

[21] Appl. No.: 465,764

[22] Filed: Feb. 11, 1983

Related U.S. Application Data

[60] Division of Ser. No. 57,322, Jul. 13, 1979, Pat. No. 4,382,423, which is a continuation-in-part of Ser. No. 952,664, Oct. 19, 1978, Pat. No. 4,285,298.

[51] Int. Cl.³ ............................................. A01K 61/00
[52] U.S. Cl. ...................................................... 119/2
[58] Field of Search ................... 119/2; 210/156, 157, 210/158, 159, 160, 122, 106

[56] References Cited

U.S. PATENT DOCUMENTS

| | | | |
|---|---|---|---|
| 1,194,250 | 8/1916 | Smits | 210/158 |
| 1,411,945 | 4/1922 | Wallene | 210/122 |
| 2,885,080 | 5/1959 | Goldman | 210/160 |
| 3,012,677 | 12/1961 | Hungate | 210/122 X |
| 3,190,448 | 6/1965 | Johnston et al. | 210/159 |
| 3,219,188 | 11/1965 | Hirs | 210/122 X |
| 4,042,507 | 8/1977 | Langmack | 210/160 |

Primary Examiner—Hugh R. Chamblee
Attorney, Agent, or Firm—Kenyon & Kenyon

[57] ABSTRACT

A method and apparatus for rearing aquatic animals wherein the animals are retained for an initial period of growth in a first rearing means including a first habitat means comprising a first plurality of stacked substrates having a first combined total surface area and wherein the animals are retained for at least one subsequent period of growth in at least one further rearing means including a second habitat means comprising a second pulrality of stacked substrates having a second combined total surface area greater than the aforesaid first combined total surface area. The habitat means of each rearing means are adapted to be inserted within or removed from the medium of such rearing means, depending on whether it is desired to rear crustaceans or fish, or both, in polyculture. In further aspects of the invention, unique filtration means for continuously filtering the rearing medium and culling means for transferring or harvesting the animals are also disclosed.

8 Claims, 27 Drawing Figures

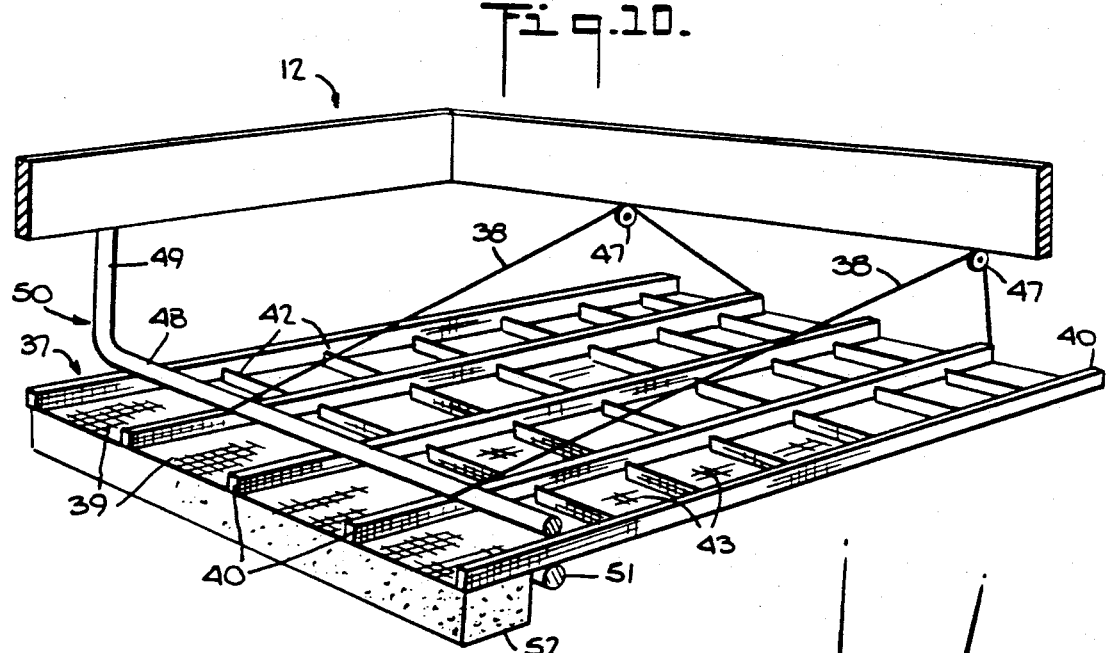
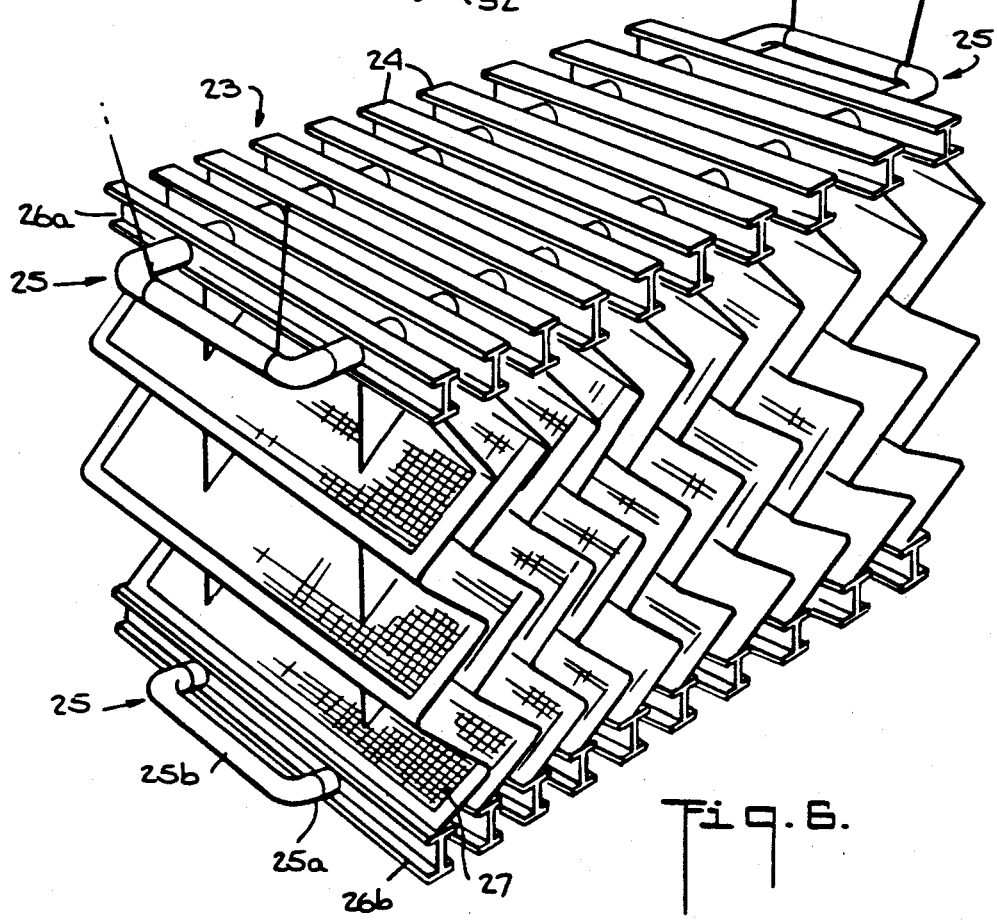

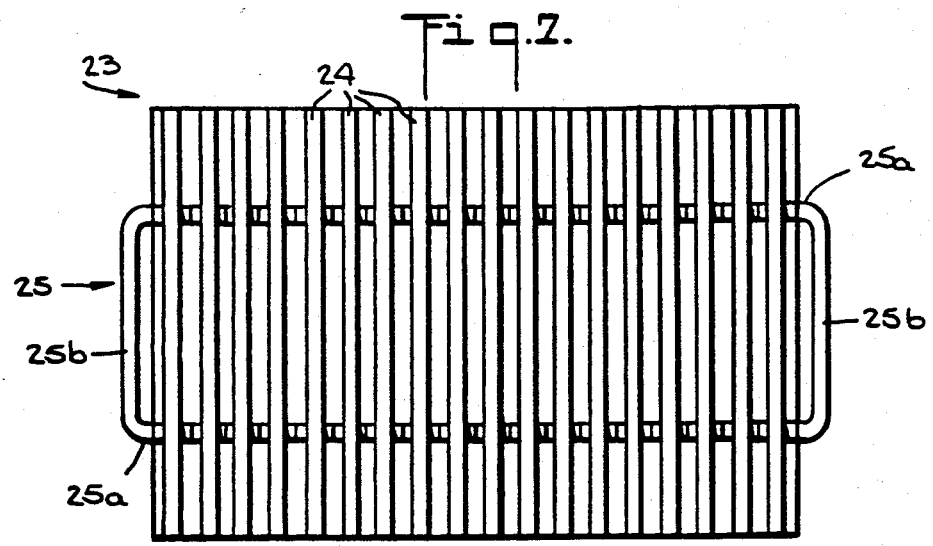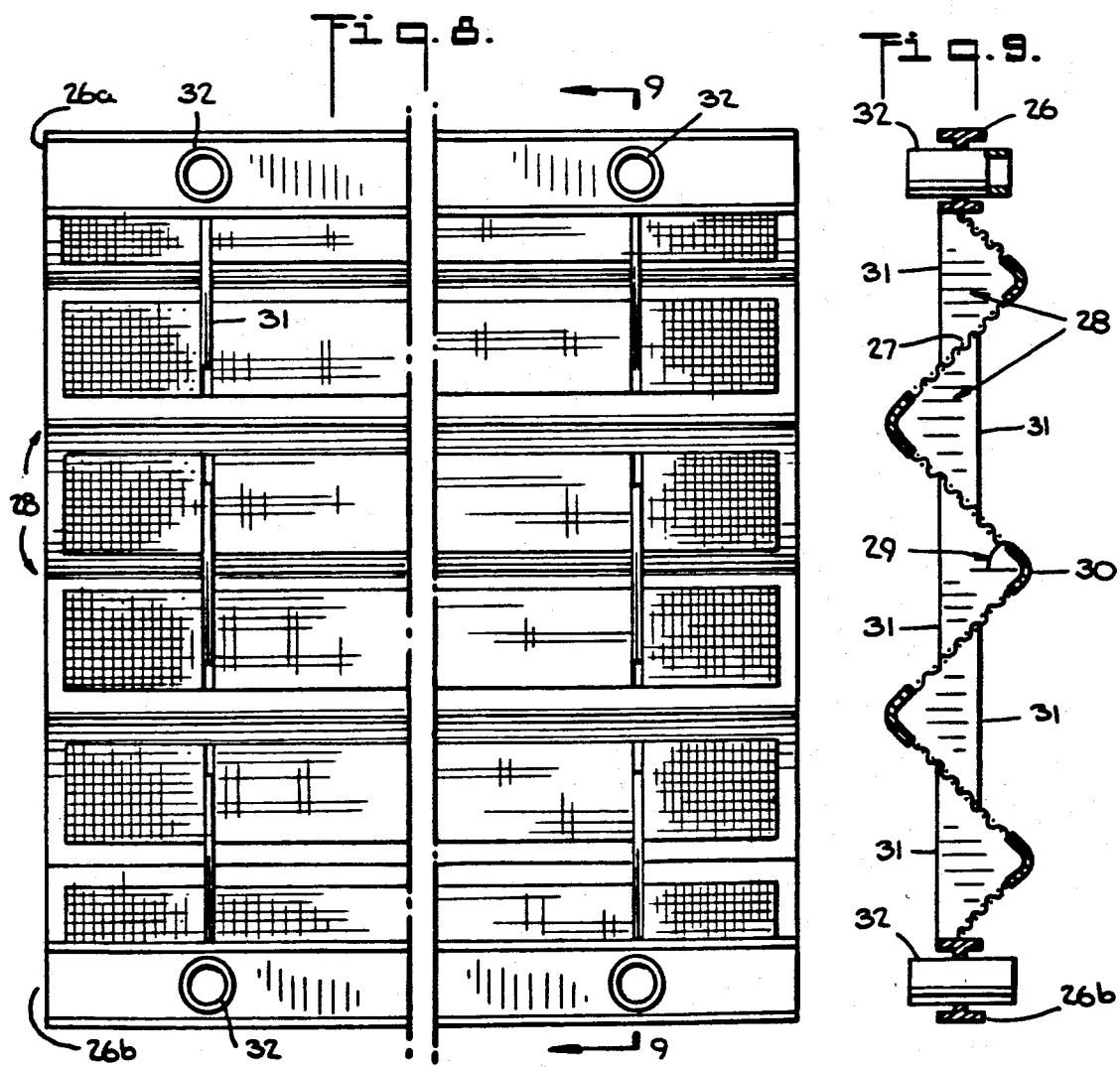

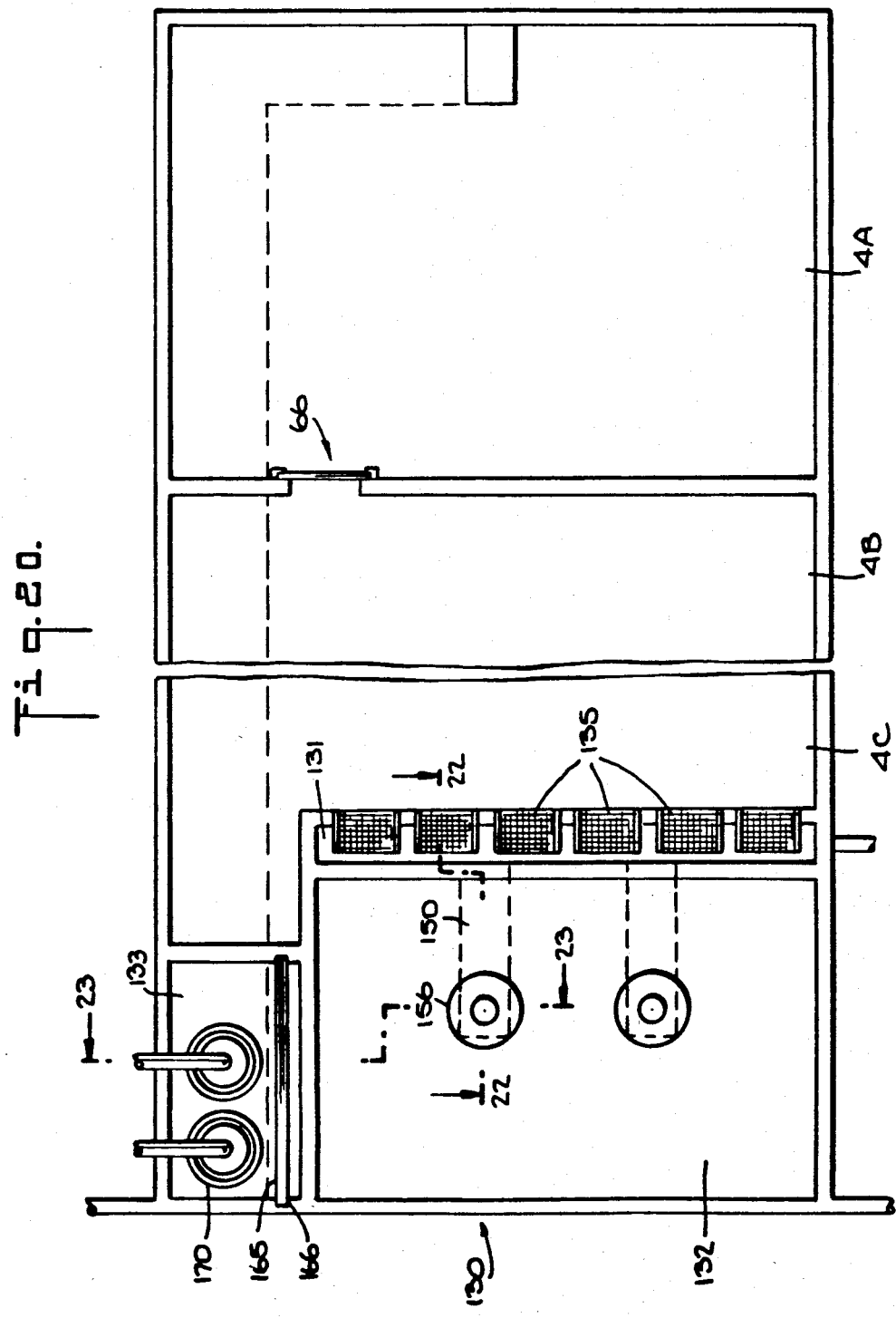

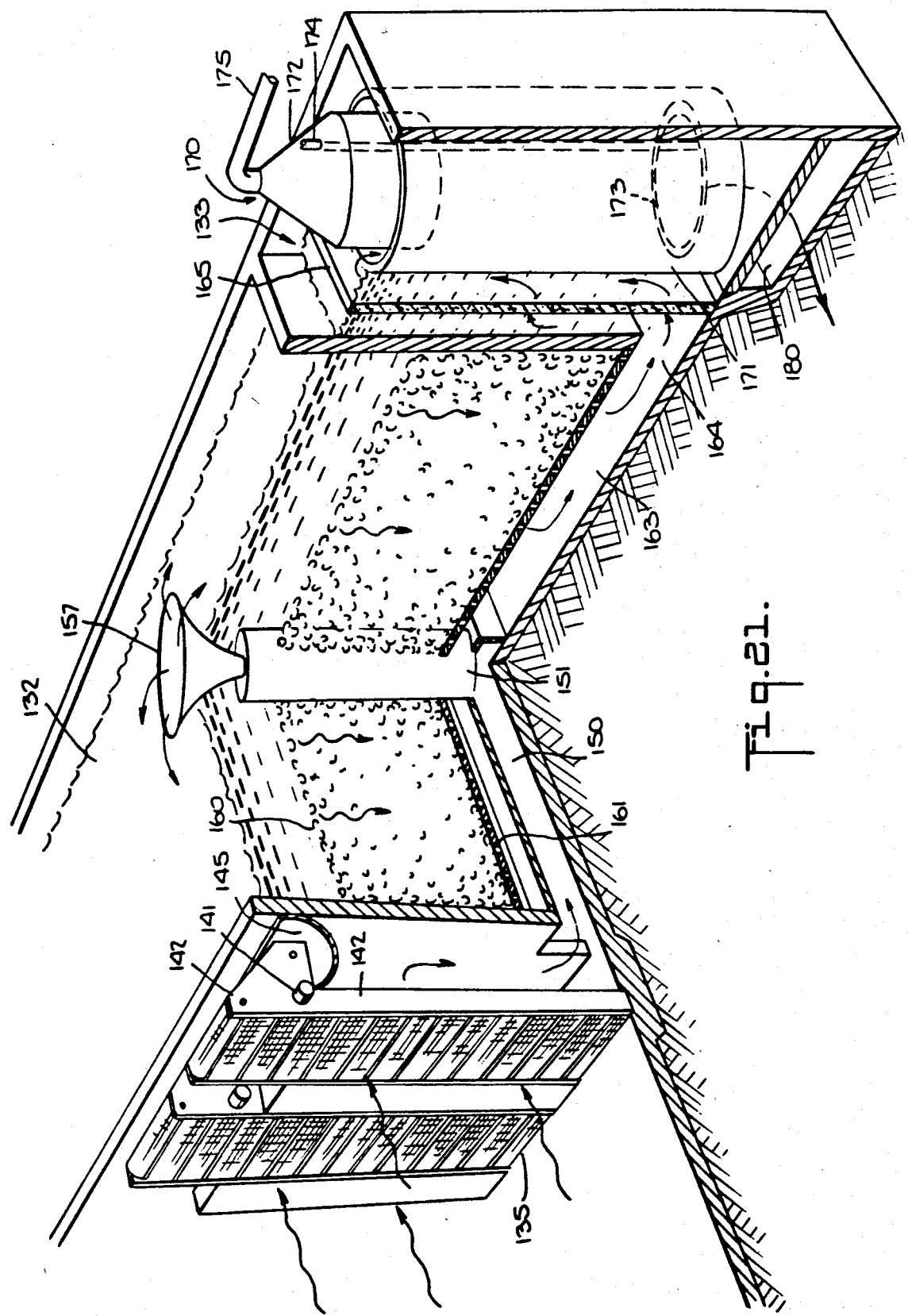

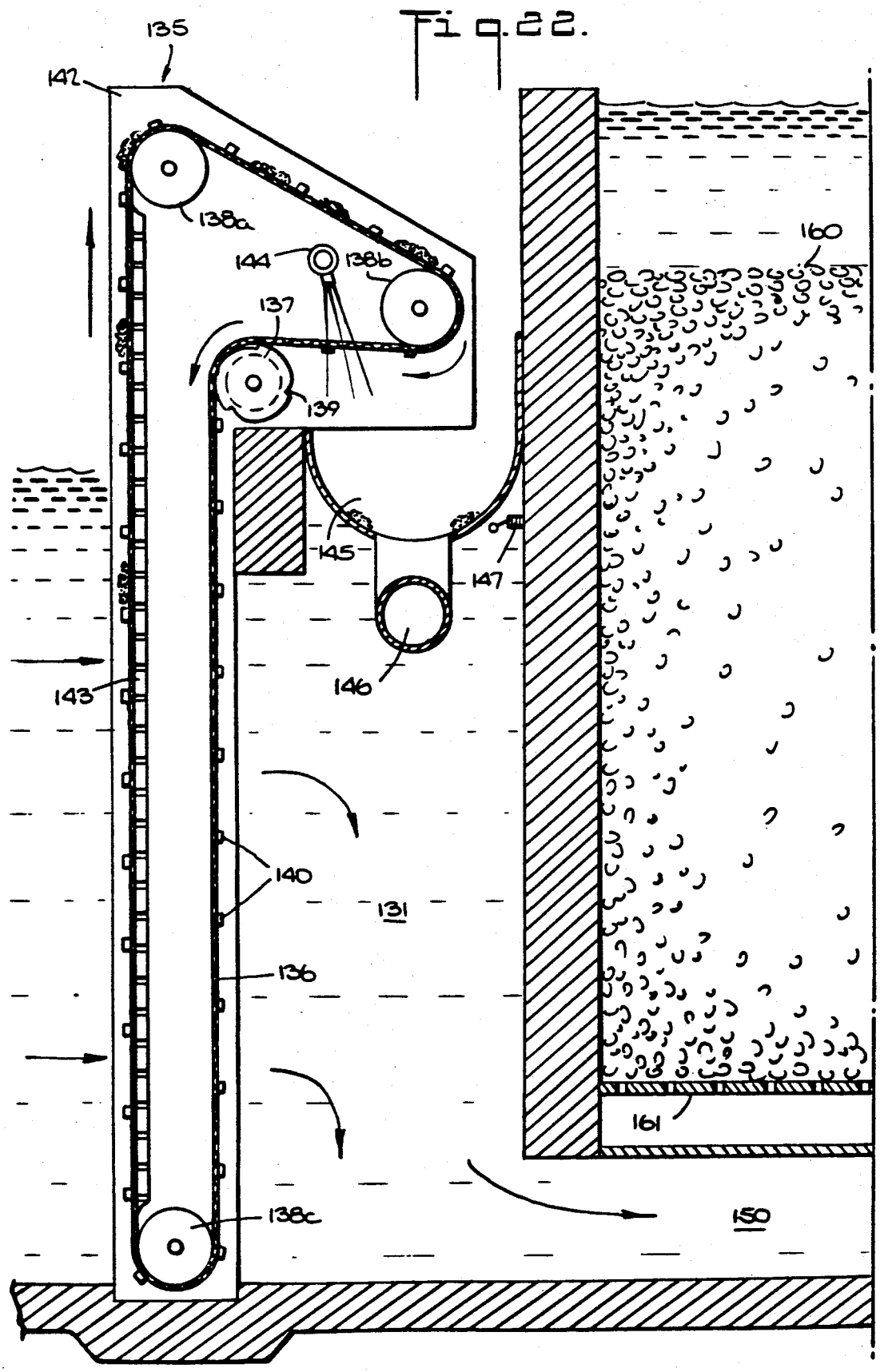

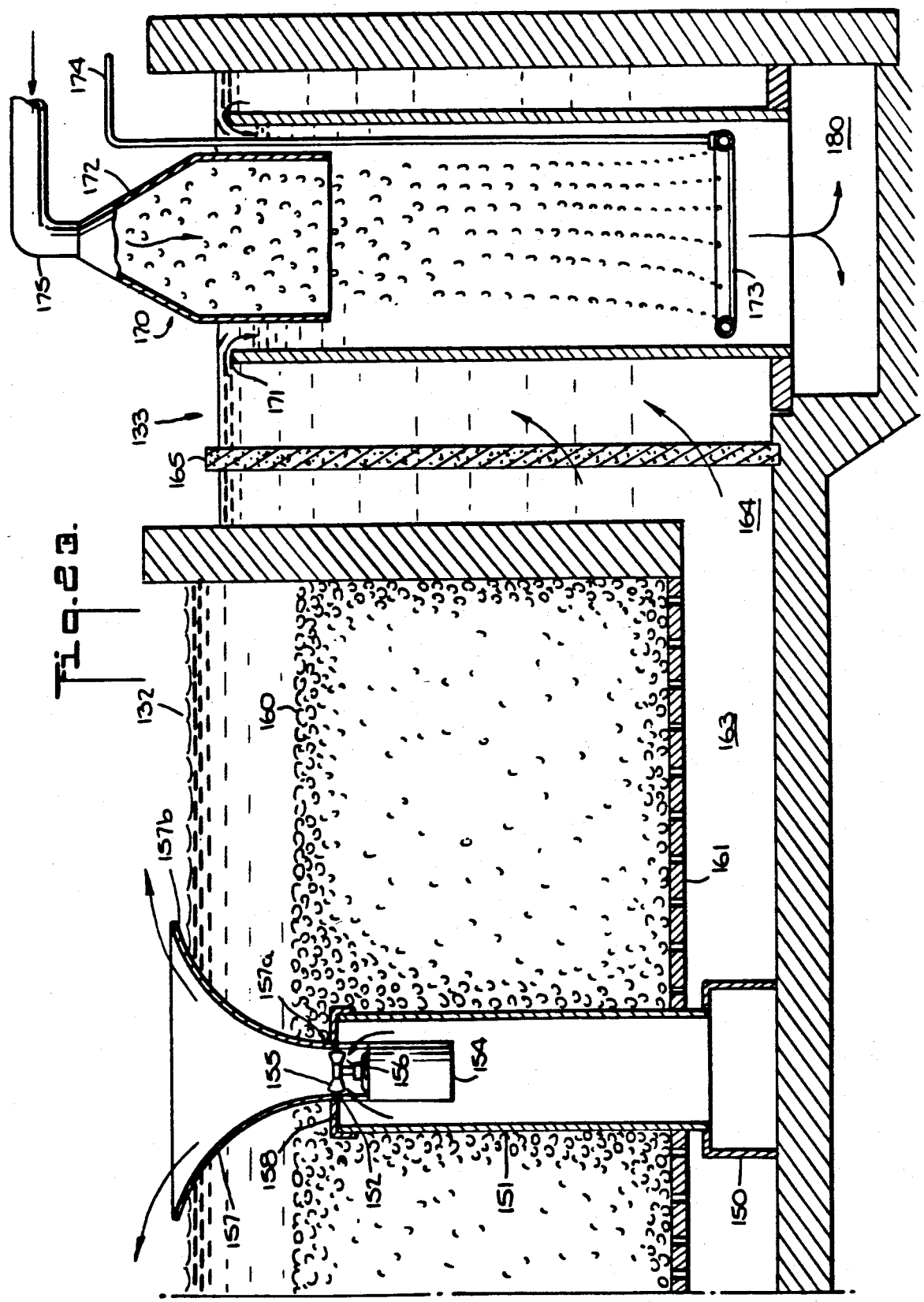

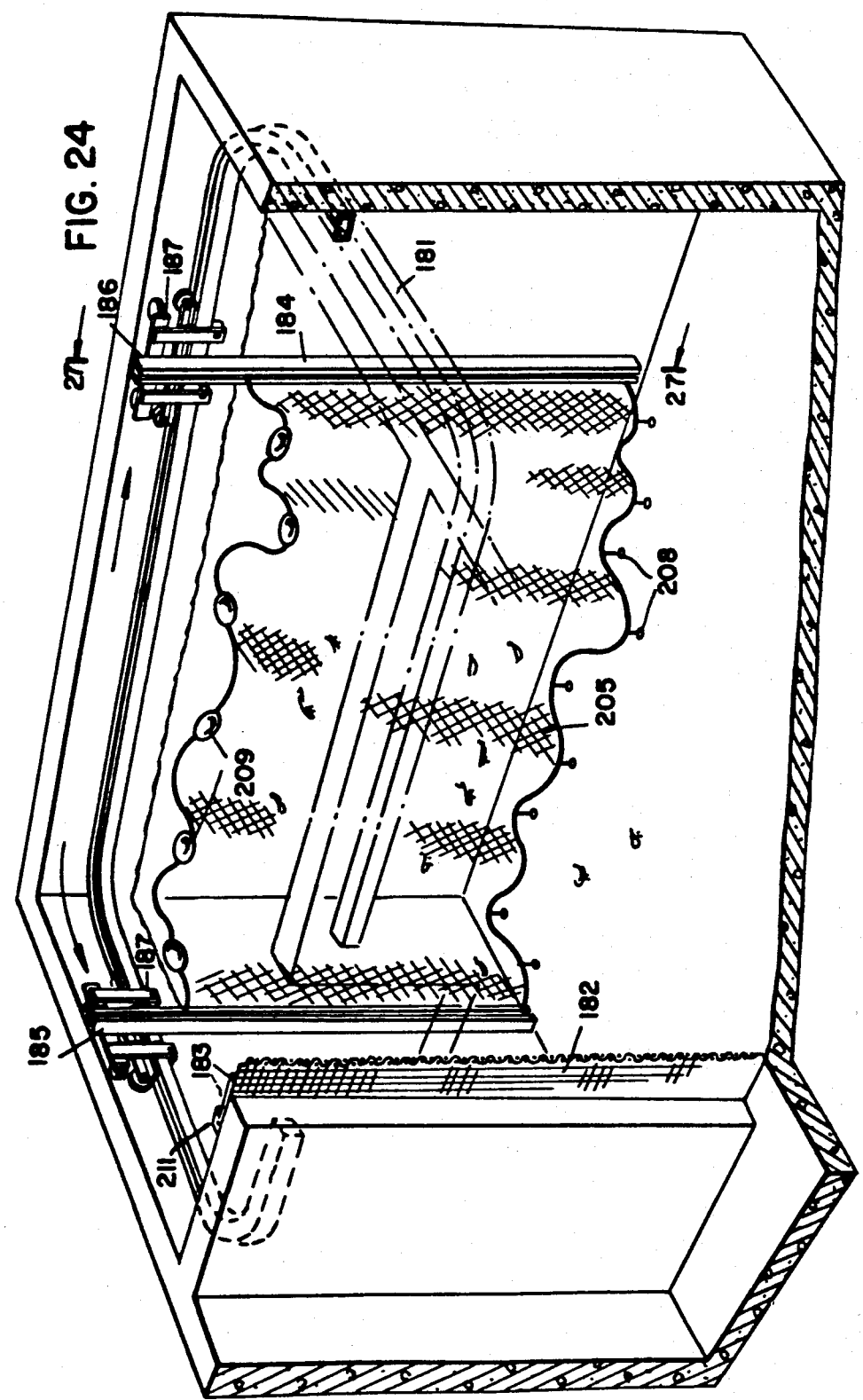

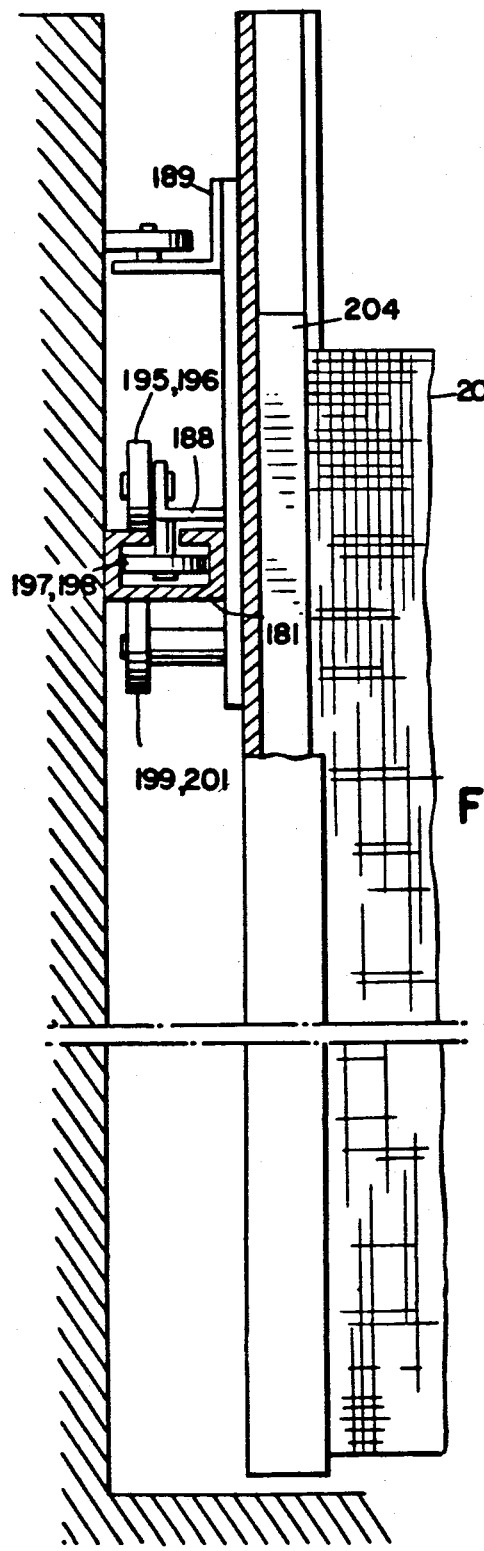
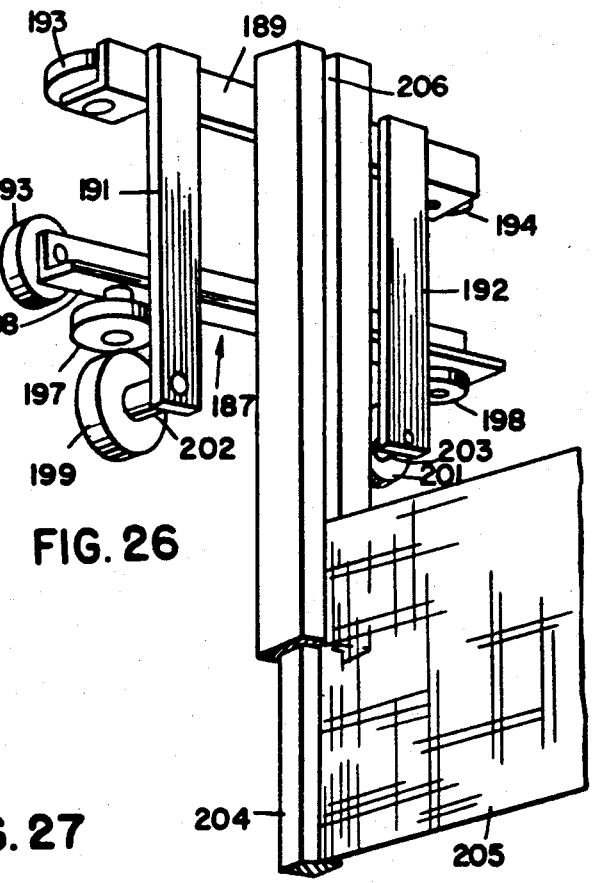
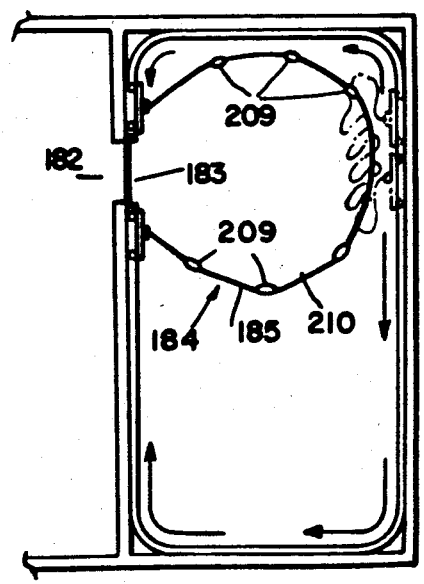
FIG. 26
FIG. 27
FIG. 25

METHOD AND APPARATUS FOR REARING AQUATIC ANIMALS

This is a division of application Ser. No. 57,322 filed July 13, 1979, now U.S. Pat. No. 4,382,423.

This application is a continuation-in-part of our co-pending application Ser. No. 952,664, filed Oct. 19, 1978, now U.S. Pat. No. 4,285,298.

BACKGROUND OF THE INVENTION

1. Field of the Invention

This invention pertains to a method and apparatus for rearing aquatic animals and, in particular, to a method and apparatus for rearing aquatic animals under controlled conditions.

2. State of the Art

In recent years, attempts have been made to rear aquatic animals under controlled conditions by employing so-called intensive culture systems and methods. U.S. Pat. No. 3,735,736, for example, discloses a method for growing edible aquatic animals, such as shrimp, catfish and trout, on a large scale wherein a series of above-ambient temperature, continuous-flow growing ponds are provided for respectively growing a batch of selected species of aquatic animals to increasingly larger average unit weights. The so-called dwell volume of each pond increases from the smallest where the fry are introduced, to the largest where the adults are recovered. The batch is sequentially transferred from one pond to the next after reaching an average unit weight selected for each pond. The ponds are fed by a stream of water which is at above-ambient temperature by virtue of being derived at least in part from effluent cooling water. The system disclosed is thus an open system since it relies on unlimited resupply of clean water rather than continuous filtration of a relatively fixed water supply.

Further systems and methods more specifically adapted for the rearing of crustaceans from post-larvae size to harvestable adult size have recently received a great deal of attention. A common thread running through many such systems is the provision of habitat structures for the custaceans within the rearing medium. For example, U.S. Pat. No. 3,658,034, issued on Apr. 25, 1972, discloses a system wherein the initial unit of the system comprises a tank provided with a habitat structure formed from a plurality of vertical substrates. Following this initial unit, are a number of further units which include tanks of increasing size and each of which is provided with a habitat structure formed from a number of cylindrical enclosures each for housing an individual crustacean. In this system, the tanks are disposed below one another so the crustacean content of a higher tank can be emptied into a lower tank when the crustaceans in the higher tank have undergone a desired degree of growth. Moreover, in this system, the water in each tank is continuously circulated to remove contaminants therefrom.

Further U.S. Patents which disclose intensive culture systems for post-larvae crustaceans wherein vertically or horizontally aligned substrates are employed as habitats for the crustaceans are as follows: U.S. Pat. No. 3,985,101, issued on July 2, 1975; U.S. Pat. No. 3,916,833, issued on Nov. 4, 1975; and U.S. Pat. No. 3,889,639, issued on June 17, 1975. In the last named patent, the intensive culture system disclosed comprises a plurality of horizontally arranged nets and a filtration system whose filter is backwashed by drainage of some of the water of the system. Moreover, in this system, light is directed through the central area of the nets to attract molting crustaceans to such areas and thereby prevent these crustaceans from being cannibalized by the remaining non-molting crustaceans.

SUMMARY OF THE INVENTION

It is an object of the present invention to provide an improved system and method which is adaptable for rearing aquatic animals under controlled conditions on a commercial scale.

It is another object of the present invention to provide a system and method for rearing aquatic animals wherein use of the rearing volume is maximized in a manner that does not contribute to the mortality of such animals.

It is a further object of the present invention to provide a system and method for rearing various species of aquatic animals simultaneously.

It is yet a further object of the present invention to provide a system and method for rearing aquatic animals wherein filtration of the rearing medium is carried out in an advantageous manner.

In accordance with the principles of the present invention, the above and other objectives are realized in a system and apparatus comprising a first rearing unit for retaining aquatic animals for an initial period of growth, including a first removable habitat structure formed from a first plurality of stacked substrates having a predetermined combined total surface area and at least one further rearing unit for retaining aquatic animals for a subsequent growing period including a second removable habitat structure formed from a second plurality of stacked substrates having a second combined total surface area greater than the aforesaid first combined total area.

The stacked substrates of the habitat structures provide the living environment for shrimp and like crustacea placed in the rearing units. The combined total surface area of the substrates of the initial rearing unit is selected so that the unit area per crustacean of such substrates is sufficiently large to encourage and promote the growth of crustaceans of sizes encompassed by the first predetermined growing stage. The second combined total surface area of the substrates of the second rearing unit, in turn, is selected to be greater than the first by an amount which results in a unit area per crustacean of the second plurality of substrates which is sufficiently large to encourage and promote the growth of crustaceans of sizes encompassed by the second predetermined growing stage.

Further rearing units are provided in instances where, due to the nature of the species being reared, it is advantageous to divde the entire growing cycle into more than two periods. Certain species of crustacea, including some varieties of shrimp, exhibit aggressive and even cannibalistic tendencies toward their fellows. In such cases, division of the entire growing cycle into several stages effectively separates the larger, more mature animals from their smaller, younger and thus more vulnerable, counterparts. The additional rearing units provided are of progressively greater volume and the total combined surface area of the substrates of each additional rearing unit is greater than that of the previous rearing unit.

By maintaining all of the removable habitat structures of the rearing units within the rearing medium, the volume of the units useful for rearing crustaceans is maximized for both the initial and subsequent growing periods. Moreover, the use of stacked substrates for subsequent growth periods is found to better promote growth and life as compared to systems using other types of habitat structures for these growth periods.

Where it is desired to rear shrimp or other crustacea and fish together in a polyculture environment, the system is adapted for such application by removing some of the habitat structures thereby providing an unobstructed area through which the fish may move freely. The fish chosen for polyculture are preferably herbivorous so they will not attack and feed on the crustaceans sharing the rearing units. Of course, if only fish are being reared, it is preferable to remove substantially all of the habitat structures. Moreover, since herbivorous fish encompassing the full range of stages comprising the entire growing cycle can coexist peacefully, a single large rearing unit may be adequate.

In a further aspect of the invention, the system is additionally provided with two alternative filtration systems which accomplish efficient filtration of the rearing units while requiring little energy input. Two types of pumps and the force of gravity satisfy the energy needs of each of the systems. The aforesaid filtration systems are additionally provided with uniquely constructed filtration assemblies, including particulate filters, bio-filters, carbon filters and foam fractionators, for appropriately filtering the medium of the rearing units.

The system and method of the invention also contemplate the use of a novel technique and apparatus for movement of the aquatic animals from one unit to the other and for eventually harvesting same.

BRIEF DESCRIPTION OF THE DRAWINGS

The above and other features and aspects of the present invention will become more apparent upon reading the following description of the preferred embodiment, in conjunction with the accompanying drawings in which:

FIG. 6 illustrates, in perspective view, an alternative substrate unit for the habitat structure of the intensive culture unit of FIG. 1;

FIG. 7 shows a plan view of the substrate unit of FIG. 6;

FIG. 8 shows, in section, a front view of one of the substrate panels of the substrate unit of FIG. 6;

FIG. 9 shows a cross section of the substrate panel of FIG. 8 taken along line 9—9 in FIG. 8;

FIG. 10 illustrates, in perspective, an alternative molting platform for the habitat structures of the intensive culture unit of FIG. 1;

FIGS. 18 and 19 illustrate cross sections of the foam fractionator of FIG. 15 taken along lines 18—18 and 19—19 of FIG. 15;

FIG. 20 illustrates a sectional view of an intensive culture unit provided with an alternative filtration system;

FIG. 21 shows, in partial cross section, a perspective view of the filtration system of FIG. 20;

FIG. 22 shows a cross section of a gate particulate filter and the bio-filter of the filtration system of FIG. 20 taken along line 22—22 of FIG. 20;

FIG. 23 illustrates a cross section of a high volume pump, the bio-filter and a foam fractionator of the filtration system of FIG. 20 taken along line 23—23 of FIG. 20; and FIGS. 24–27 show various views of the culling apparatus of one of the rearing unit of FIG. 1.

DESCRIPTION OF THE PREFERRED EMBODIMENT

Figure 1:
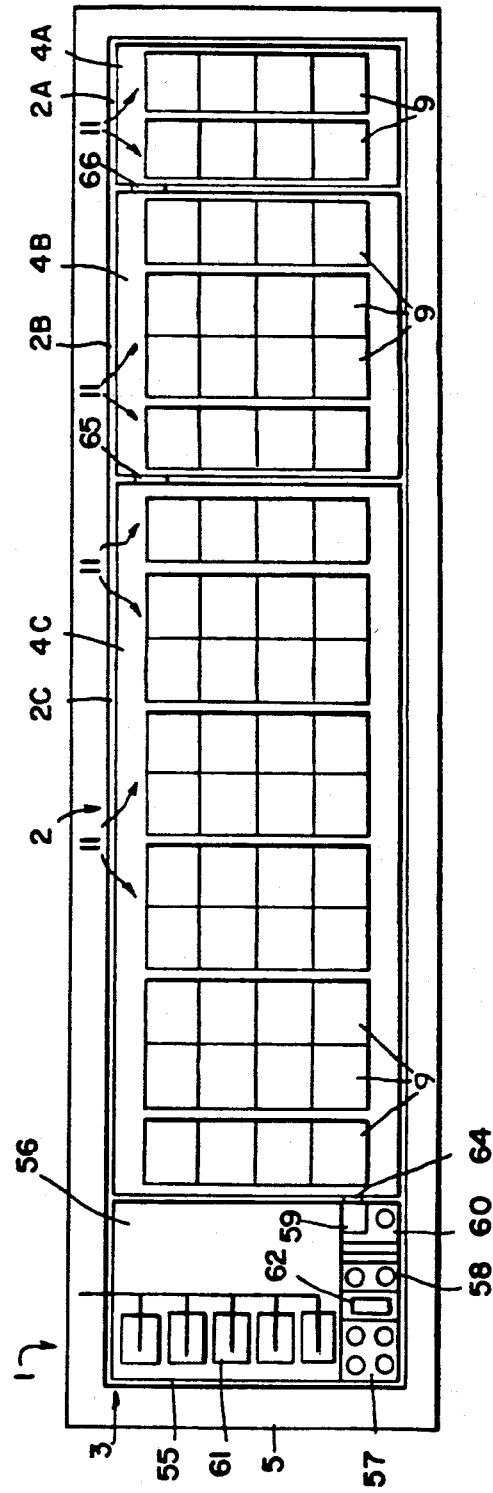
FIG. 1 shows, in schematic fashion, an overall view of an intensive culture unit embodying an apparatus and method in accordance with the principles of the present invention.

The preferred form of the method and apparatus of the present invention will be illustrated in terms of an intensive culture system or unit suitably configured to rear shrimp from post-larvae size to harvestable adult size and adaptable for rearing shrimp and fish together where desired. Referring to FIG. 1, the system 1 includes a rearing area 2 comprised of three adjacent rearing units 2A, 2B and 2C and a filtration area 3 adjacent the rearing unit 2C. The rearing units 2A, 2B and 2C comprise rearing tanks 4A, 4B and 4C whose walls are formed from cinder blocks as are those of the filtration area 3. A further cinder block area forms a walkway 5 around the rearing units and the filtration area. This walkway and the walls of the rearing tanks and filtration area support a frame structure 6 on whose exterior is placed a plastic roof 6A (See, FIGS. 2 and 3) so as to form a fully enclosed system. Advantageously, in the area of the rearing units, the plastic of the aforesaid roof is clear so that the roof acts to couple solar energy into the system for heating same.

The rearing tank 4A of the rearing unit 2A holds post-larvae shrimp for an initial stage or period of post-larvae growth, while the tank 4B of the unit 2B holds shrimp who have completed this initial period of growth for a second growth stage. The tank 4C of the unit 2C, in turn, holds shrimp who have undergone the aforesaid second growth stage and until the shrimp reach maturity. As is apparent, the rearing tanks increase in volume, in going from the tank 4A holding the shrimp who are in the initial post-larvae growth stage to the tank 4C holding the shrimp that reach maturity. In the present illustrative case, this is accomplished by increasing the length of the tanks, while maintaining their widths constant. The purpose of this increased volume is to permit the use in the rearing units of habitat structures comprised of stacked substrates which increase in total surface area in going from the rearing tank 4A to the rearing tank 4C. This increased surface area accommodates the increase in size of the shrimp, thereby affording sufficient habitat area for promoting growth, while maximizing the volume of the tanks usable for rearing.

Figure 2:
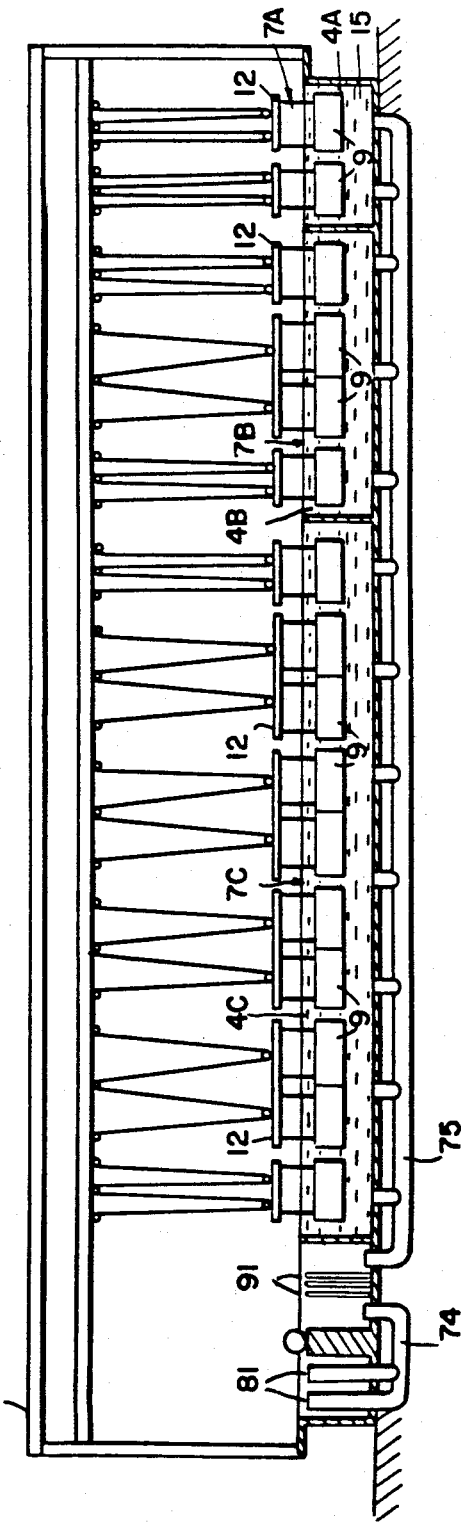
FIG. 2 illustrates, in partial cross section, a side view of the intensive culture unit of FIG. 1.

As shown in FIGS. 1 and 2, the rearing units 2A, 2B and 2C thus include removable habitat structures 7A, 7B and 7C. The aforesaid habitat structures 7A, 7B and 7C are advantageously all construed from a basic substrate unit 9, the larger area structures being provided with an increased number of units to provide the increased area.

Figure 3:
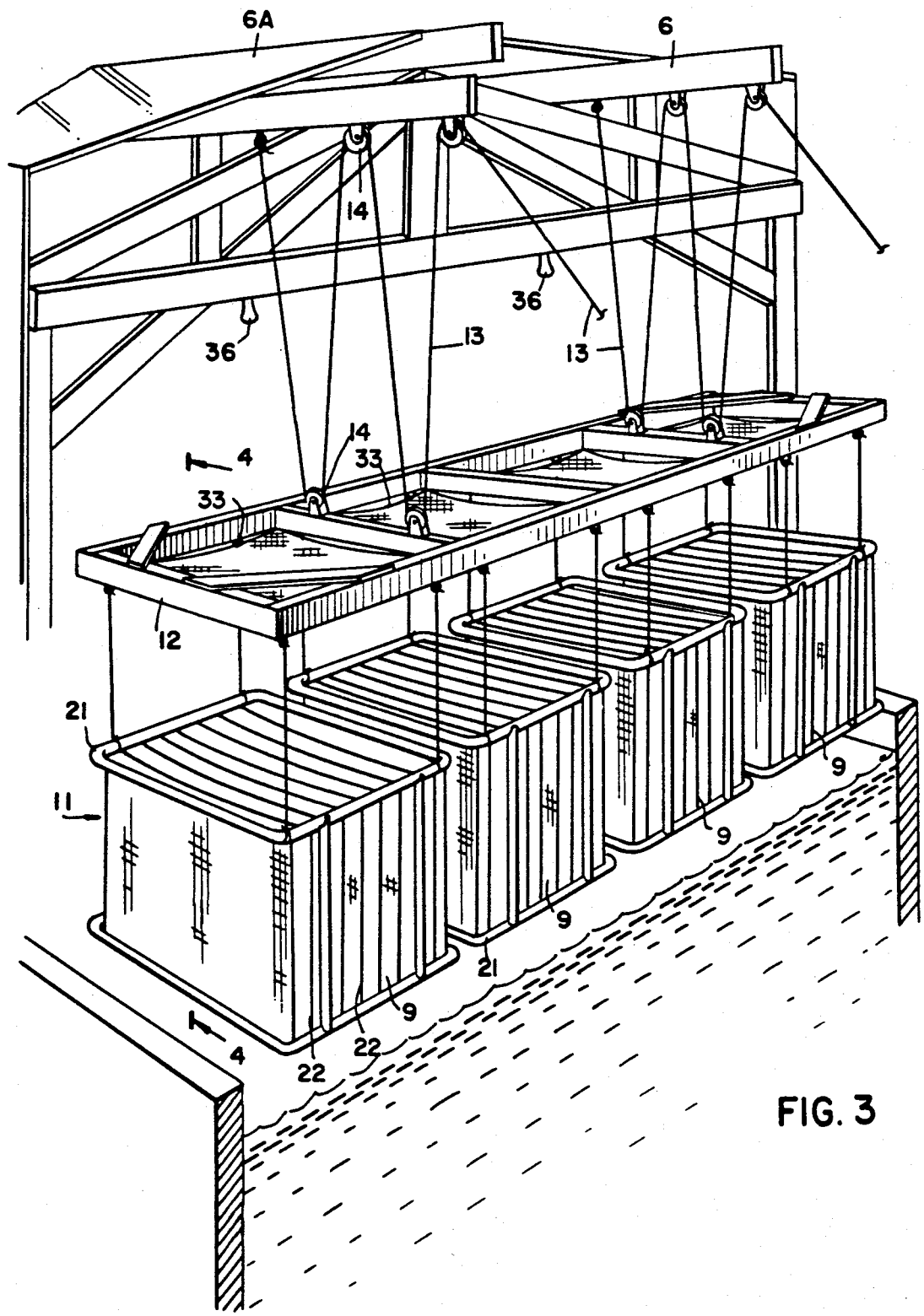
FIG. 3 illustrates, in perspective view, a habitat structure and support assembly of a rearing unit of the intensive culture unit of FIG. 1.

In the present illustrative case, the habitat structure 7A includes eight substrate units, the habitat structure 7B, sixteen substrate units and the habitat structure 7C, forty substrate units. The substrate units of each habitat structure, in turn, are arranged in banks 11 formed of one or more columns of substrate units (FIGS. 1, 2 and 3). Each such bank is supported on a common rectangular frame 12 which permits the bank to be inserted and removed from the tank of its respective rearing unit. As shown, the substrate units of the banks are tied to their respective frames so they hang therefrom upon insertion into the rearing tanks.

The substrate banks 11 are lowered and raised from their respective rearing tanks via the lines 13 of individual pulley systems 14 coupling the support frames 12 of the banks to roof frame structure 6. There pulley systems, in turn, are activated by winches (not shown) also supported on the frame. When lowered into the rearing tanks, the banks 11 are maintained at a predetermined height above the tank bottoms. This facilitates feeding of the animals, as well as filtration of the tanks and cleaning of the tank bottom. The banks are also maintained below the surface of the medium 15 in their respective tanks.

Figure 4:
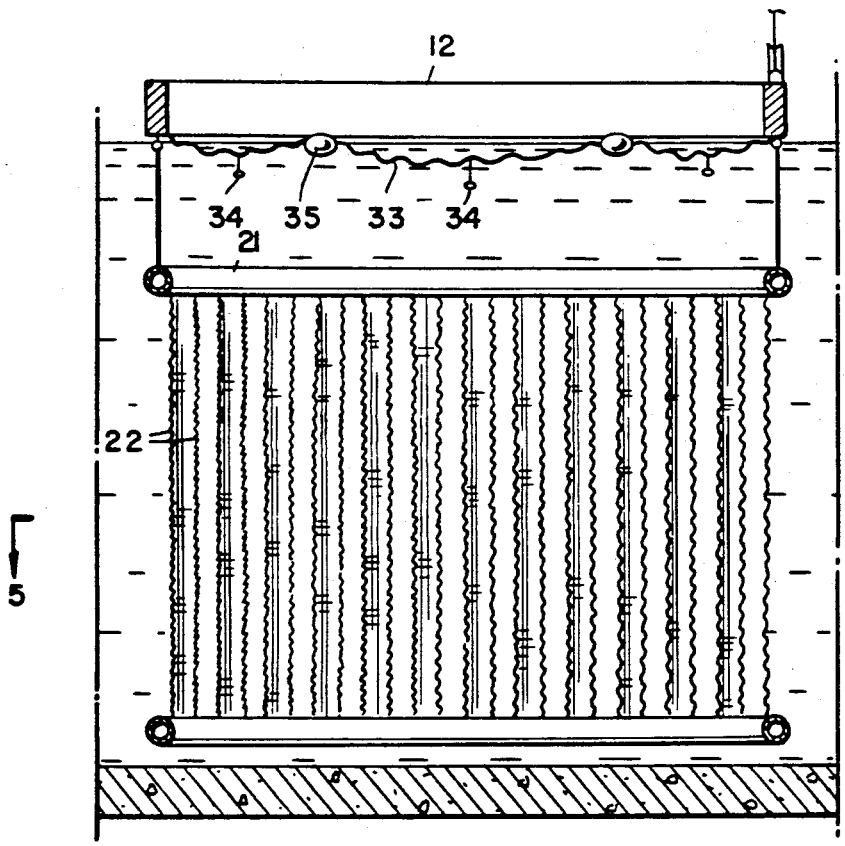
FIG. 4 illustrates, in cross section taken along line 4—4 in FIG. 3, one of the substrate units of the habitat structure of FIG. 3 lowered into a rearing tank.
Figure 5:
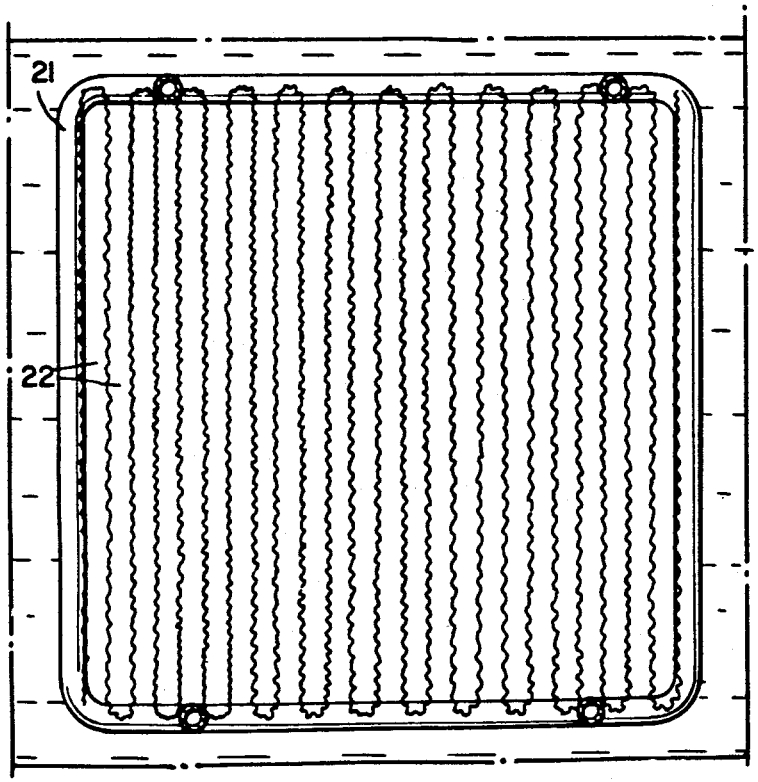
FIG. 5 shows a cross section of the substrate unit of FIG. 4 taken along line 5—5 in FIG. 4.

As shown in FIGS. 3 to 5, each of the substrate units 9 comprises a three-dimensional, open rectangular frame 21 formed of tubing members. Stretched across opposite sides of the frame are a plurality of parallel substrates 22 which, as shown, are formed of meshed screening. These horizontally displaced, vertically arranged stacked substrates or screens 22 serve as the habitats for the animals who crawl up them. The spacing between the substrates 22 of each substrate unit 9 is dependent upon a number of factors, such as, for example, the rearing unit in which the substrate unit is to be situated, the size of the animal in such rearing unit, etc. Typically, for shrimp, the spacing may be in the range of 2 to 3 inches depending on the aforesaid factors.

An alternative substrate unit construction is shown in FIGS. 6-9. This type of substrate unit 23 is formed from a plurality of horizontally stacked substrate panels 24 held together and supported by upper and lower racks 25, preferably of a tubular construction. As shown in FIGS. 8 and 9, each substrate panel includes upper and lower rigid horizontal members 26a and 26b, respectively. Attached to the horizontal members is a mesh screen 27 which, in contrast to the completely vertical screens shown in FIGS. 3-5, has a plurality of accordion-like folds 28. Each fold forms an acute angle 29 with respect to a horizontal plane through the apex 30 of the fold. This angle is preferably equal to 45 degrees. Secured to the face of the screen 27 are any number of reinforcing members 31 which maintain the rigid folded configuration of the screen.

The tubular racks 25 which form the panels into a unit include longitudinal portions 25a and transverse portions 25b. The longitudinal portions pass through the collars 32 formed in the horizontal members of each substrate panel. The collars maintain the even spacing of the panels when mounted on the racks. The transverse portions of the racks lock the panels together. The transverse portions also add rigidity to the substrate unit, thereby preventing it from skewing when inserted into or removed from the rearing medium.

The folded screens of this alternative substrate unit offer the advantages of both pure horizontal or vertical substrates. Like the pure horizontal substrates, the inclined surfaces formed by the folds will catch food sinking in the rearing medium and hold it for the animals. At the same time, the folded screens satisfy the observed propensity of shrimp and other crustacea to scale vertical surfaces. Furthermore, the folds of this alternative substrate unit create discontinuities in the planes inhabited by the animals, thereby obstructing their line of vision. Imposing this limitation on the abiity of shrimp and certain other species to see one another reduces the mortality of such animals due to cannibalism.

As above mentioned, the increase in total surface area of the substrates of each habitat structure relative to that of the preceding structure is dependent upon the increased unit area per crustacean required to sustain and encourage growth of the crustacean in each particular rearing unit relative to that required in the preceding unit. The unit area per crustacean for encouraging growth in a particular rearing unit will, of course, depend heavily on the growth stage associated with that unit, as relatively larger growth stages will result in crustaceans of relatively larger increased size and will require a proportionally relatively larger unit area per crustacean to encourage growth. The number of growth stages employed, in turn, is dependent upon the desire to limit the system and, hence, the growth stages to a minimum so as to preserve compactness and minimize labor, while at the same time, affording a sufficient number of growth stages so that the difference in size of the crustaceans in each stage and, hence, in a given rearing unit tank, is not such as to permit a large degree of cannibalism of the smaller crustaceans by the larger crustaceans.

With these conditions in mind, it has been found that, for shrimp, the growth stages subsequent to the initial stage may encompass an increased growth in a range from 25 to 200 percent before either the number of rearing units becomes too large, or the difference in the size of the shrimp in each stage results in excessive mortality due to cannibalism. This means that each growth stage subsequent to the initial stage may encompass an increase in size of from 25 to 200 percent, which, in turn, means that the increase in total substrate area and, hence, unit area per shrimp from one rearing unit to a subsequent unit will also be approximately in the range from 25 to 200 percent.

In the illustrative embodiment, the initial growth stage is selected to encompass a 200 percent growth from post-larvae size and each of the subsequent growth stages a 100 percent increase in growth relative to the preceding stage. Thus, with this embodiment of the invention, three growth stages are required for the shrimp to increase in size from their initial post-larvae size of approximately one-half inch to their adulthood size of 6 inches. In particular, the initial stage covers the growth period from ½ to 3/2 inches, the second stage from 3/2 to 3 inches and the final stage from 3 inches to 6 inches. Furthermore, in this embodiment, the number of rearing units is three, as depicted, and the substrate units of the rearing unit holding the shrimp in the final stage have a total combined surface area which is 100 percent greater than that of the units holding the shrimp in the middle stage, the surface area of the latter substrate units, in turn, being 100 percent greater than that of the units holding the shrimp in the initial stage. Additionally, in this embodiment, the number of substrate units per stage is as depicted in FIG. 1, and the first and second growth stages each cover approximately a 6-week period, and the final growth stage covers approximately a 3-month period.

In order to further facilitate rearing of the shrimp and to further prevent the cannibalistic tendencies of the shrimp from increasing mortality, each rearing unit 2A, 2B and 2C is further provided with molting areas which act as sanctuaries for molting shrimp who have lost their outer shell and, therefore, are prone to attack from non-molting shrimp. As shown, these areas are provided by mesh netting sections 33 which are attached to the frames 2 and hang therefrom above the substrate banks 11. When the banks 11 are lowered into their respective rearing tanks, these netting sections lie within the tank medium immediately above the substrate units, and, hence, are accessible to molting shrimp whose tendency when molting is to seek shelter away from the other shrimp.

To further facilitate use of these molting platforms, the netting sections 33 are provided with means for creating high and low spots relative to the substrate units. This is simply and easily realized by attaching leads 34 and floats 35 at alternate positions along the netting. The low spots provide areas where the molting shrimp can attach themselves to the nets and the high spots provide areas where the attacked shrimp can crawl to isolate them further from the other shrimp. Additional isolation is achieved by providing dim lighting in the area of the netting sections 33, this being accomplished by lights 36 attached to the frame 6 and directed at the sections.

Molting platforms of the above-described type accomplish a significant reduction in shrimp mortality while possessing the advantage of simplicity. However, when the substrate banks are raised from their respective rearing tanks, shrimp inhabiting the netting sections 33 may become trapped thereon and remain out of water for lethal time periods. This drawback is eliminated by the alternative molting platform construction shown in FIGS. 10–13.

This platform comprises a tray 37 made of a substantially rigid, bendable mesh material such as galvanized hardware cloth, suspended from support frame 12 by rope-like means 38. The tray includes a relatively flat bottom 39 divided into rows by longitudinal ridges 40. The ridges are bent into the mesh and provide rigidity to the tray. The tray further includes a plurality of slits 41 formed by cutting the mesh on three sides and erecting the resulting flap to form a partitioning wall 42. The slits are spaced, preferably evenly, in the rows formed by ridges 40. The ridges and the walls 42 form compartments 43 for molting shrimp seeking isolation from non-molting shrimp.

As noted above, the tray is suspended from support frame 12 by suitable rope-like means 38, such as ropes, lines or cables. The rope-like means is attached to ends 45 and 46 of tray 37. The rope-like means also passes over pulleys 47 mounted on the underside of support frame transverse member 12a and over the horizontal section 48 of U-shaped bar 50 whose opposite vertical sections 49 are affixed to the adjacent support frame transverse member. The pulleys and U-shaped bar are positioned intermediate the attached ends of the rope-like means.

The platform of the present alternative embodiment is further provided with a weight 51 and opposing flotation means 52 attached to the underside of tray 37 at the end of the tray nearest the horizontal section of U-shaped bar 50.

Figure 12:
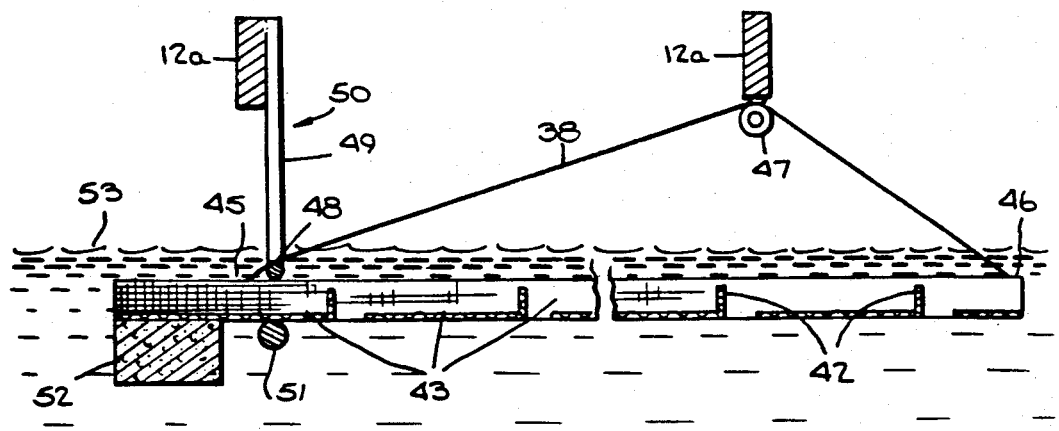
FIG. 12 shows a cross section of the molting platform of FIGS. 10 and 11 taken along line 12—12 of FIG. 11 in the position assumed by the molting platform when lowered into the rearing medium.

When the substrate banks are lowered into the rearing tanks, the mesh tray is level and suspended several inches below the water surface 53 as illustrated in FIG. 12. Illumination is provided by the lights 36 shown in FIG. 3. Molting shrimp attracted to the tray by the illumination and the location of the tray near the surface have access to the compartments 43 by crawling either over the periphery of the tray or through the slits 41.

Figure 13:
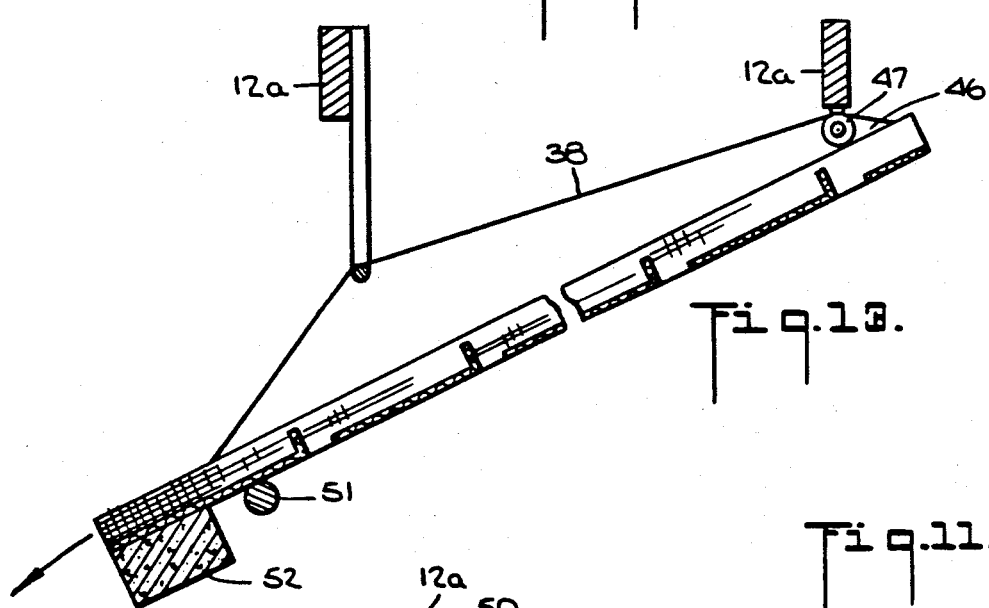
FIG. 13 shown the same view as FIG. 12 with the molting platform in the position it assumes when raised out of the rearing medium.
Figure 11:
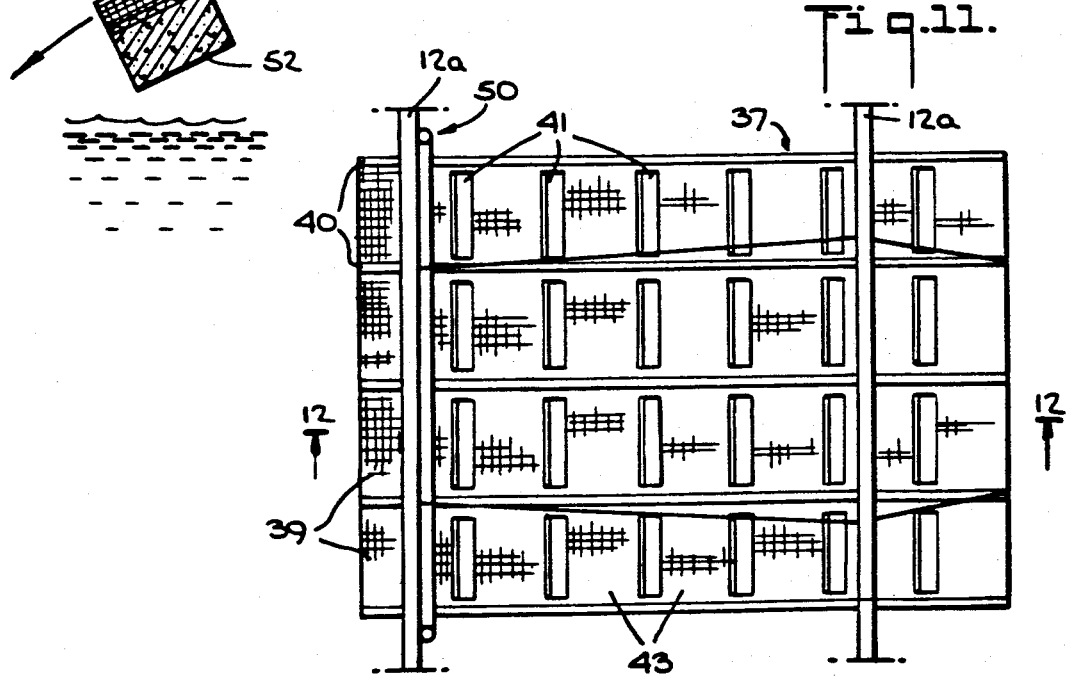
FIG. 11 shows a plan view of the molting platform of FIG. 10.

When the substrate banks are raised out of the tank, the weight 51 is no longer opposed by flotation means 52 and thus causes the tray to assume the slanted position shown in FIG. 13. As the banks are removed from the medium, the rope-like means pass freely over bar 50 and pulleys 47 until the end 46 of the tray abuts the pulleys. With the tray on a slant, the shrimp slide to and through slits 41 and back into the medium instead of becoming trapped thereabove. When the banks are re-lowered into the tanks, the flotation means causes the tray to reassume its level position with end 45 abutting the bar 50 as shown in FIG. 12.

As hereinbefore noted, the system of invention is adapted to provide an appropriate environment for rearing shrimp or other crustacea and fish together by removing some of the habitat structures from the rearing medium. Referring to FIGS. 1 and 2 which show overall views of the preferred embodiment configured in three stages for rearing shrimp, a polyculture environment may be provided by removing one or more substrate banks 11 from each of the rearing tanks 4A, 4B and 4C. The banks are removed via the lines 13 of the individual pulley systems described earlier. The number of banks removed will depend on the relative sizes of the shrimp and fish populaces. Of course, where only fish are to be reared, all of the banks 11 may be removed, as well as the screens covering openings 65 and 66, thereby effectively forming a single large rearing unit through which the fish may move freely.

As above-mentioned, the system of the invention is also provided with a filtration area 3 located adjacent the rearing unit 2C. This filtration area provides filtration for the rearing tanks of the rearing units and maintains the medium 15 therein substantially contaminant free.

Figure 14:
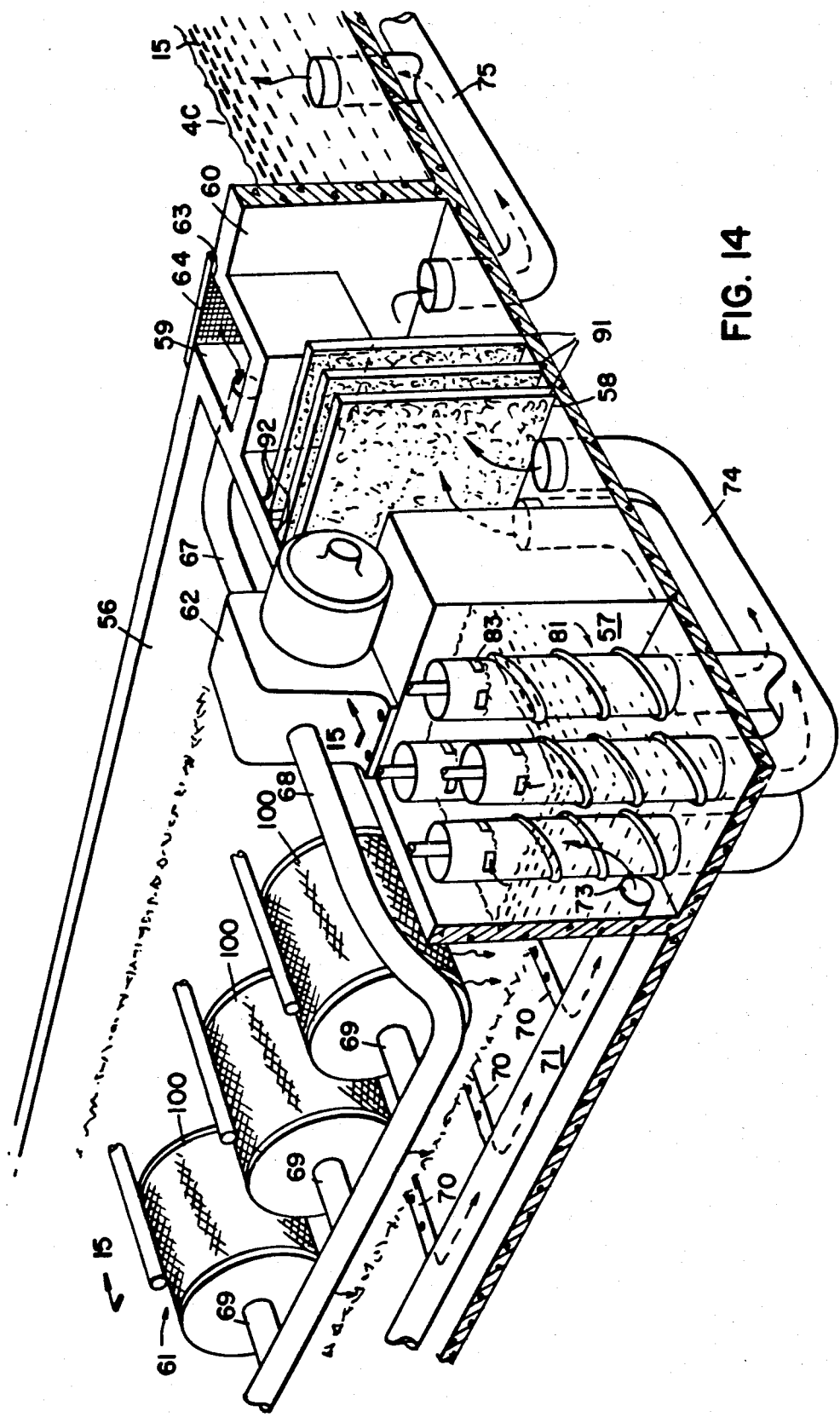
FIG. 14 illustrates, in perspective view, the overall filtration system of the invensive culture unit of FIG. 1.

More particularly, as shown in FIGS. 1, 2 and 14, the filtration area 3 comprises a tank 55 which is partitioned by walls into a bio-filter filtration section 56, a foam fractionator filtration section 57, a carbon filter filtration section 58 and filtration inlet and outlet sections 59 and 60. The tank 55 also supports a particulate filter arrangement 61 which is situated above the bio-filter section 56 and a pump 62 which is situated on the tank wall separating the foam fractionator and carbon filter sections 57 and 58. The filtration inlet section 59 borders an aperture 63 closed off by a screen 64 in the wall of the rearing tank 4C. Medium 15 from the rearing tank 4C, as well as the medium from the rearing tanks 4A and 4B and flowing into the tank 4C through the screened openings 65 and 66 (see FIG. 1), thus enters the inlet section 59 through the screen 64. A cylindrical conduit 67 connects the intake of the pump 62 to the inlet section 59 and the pump 62 raises the energy of the medium flowing into the inlet section to a level or head sufficient to carry the medium, via gravity flow, through the entire filter assembly and back to the rearing tanks. Filtering is thus carried out using a single pump and gravity flows, thereby minimizing the energy requirements needed for operation.

More specifically, the medium entering the pump 62 is coupled to the pump output which feeds a manifold 68 which couples the medium to cylindrical inputs 69 of the particulate filter arrangement 61. These inputs feed a plurality of particulate filters 100 forming the fiber arrangement 61 and supported above the bio-filter section 56 on the walls of tank 55 forming same. The medium passes through the filter arrangement 61, descends above through the bio-filter section 56 and is collected in apertured pipes 70 at the bottom thereof. The pipes 70, in turn, lead to a collector pipe 71 which carries the medium through an aperture 73 in the tank wall bordering the foam fractionator section 57. The medium then passes through the foam fractionators 81 and is carried by a coupling pipe 74 to the carbon filter section 58. After passage through the filter substrates 91, the medium enters the filter outlet section 60 and is coupled therefrom back to the rearing tanks 4A through 4C by a return pipe 75.

Figure 15:
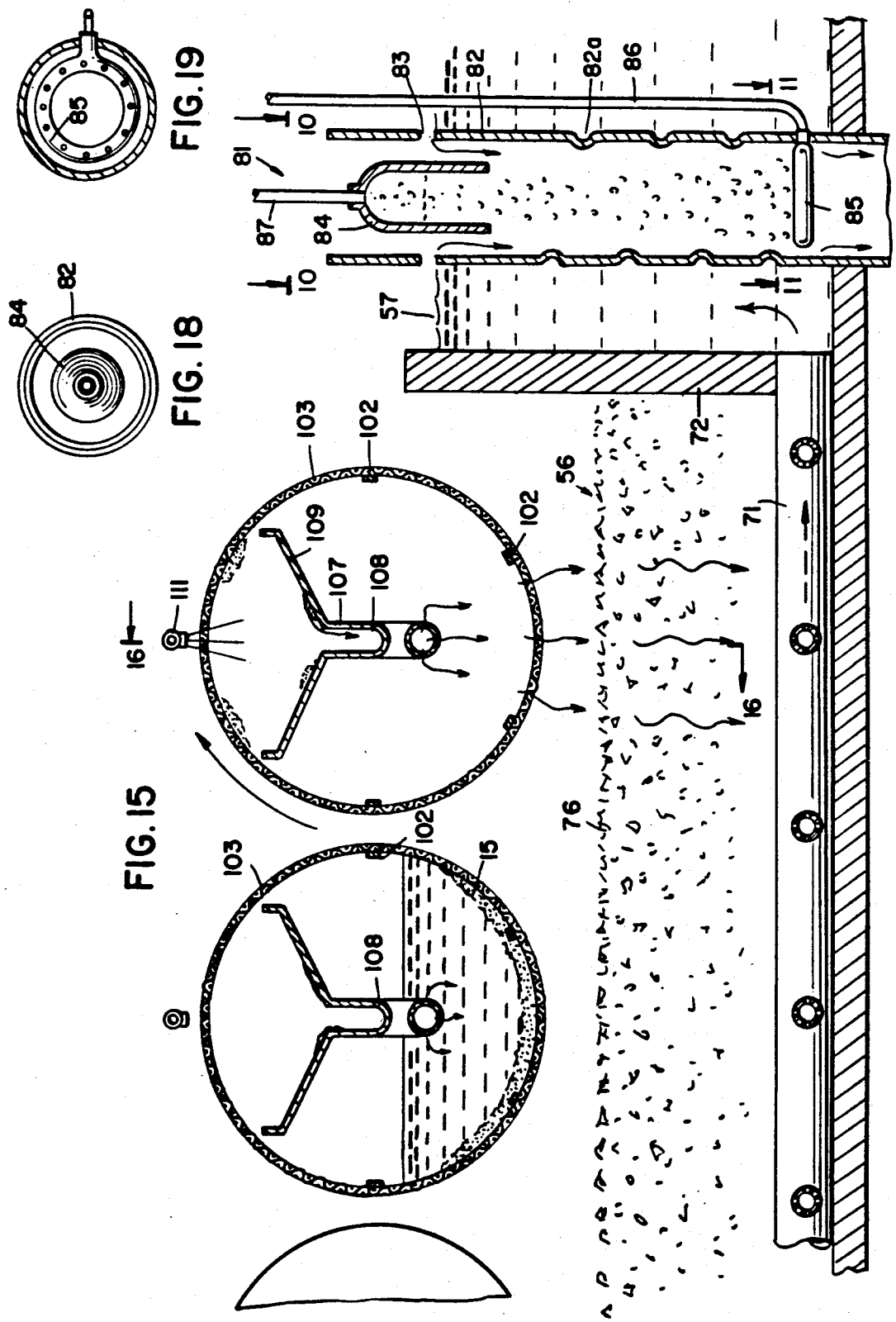
FIG. 15 shows a cross section of the bio-filter, particulate filters and foam friactionator of the filtration system of FIG. 14 taken along line 15—15 of FIG. 14.
Figure 16:
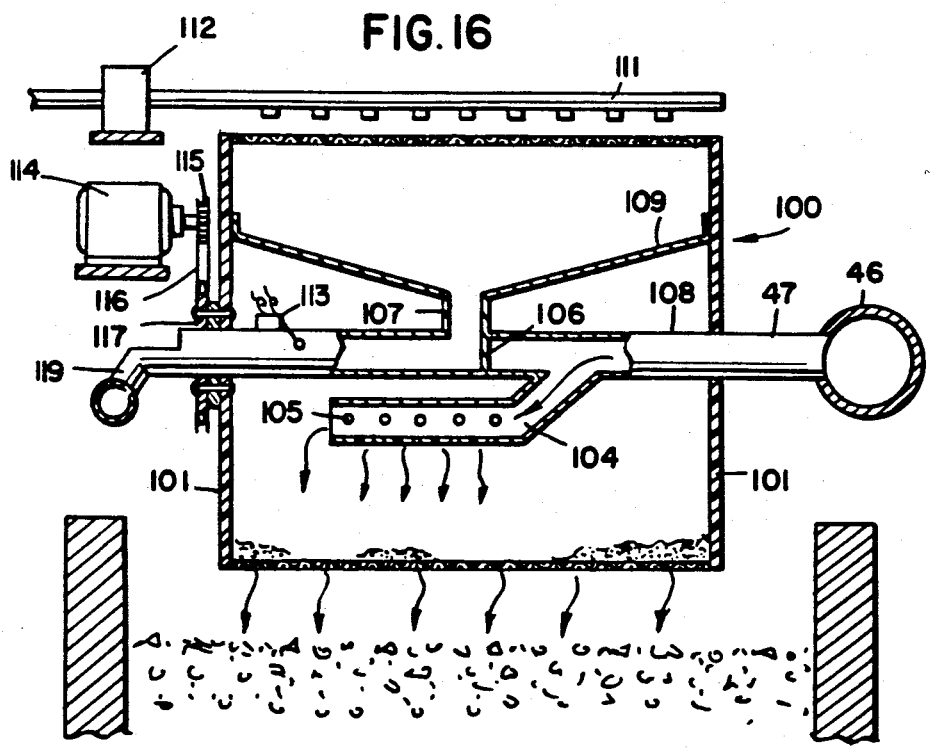
FIGS. 16 and 17 illustrate cross sections of the particulate filter and the bio-filter of FIG. 15, taken along line 16—16 of FIG. 15.
Figure 17:
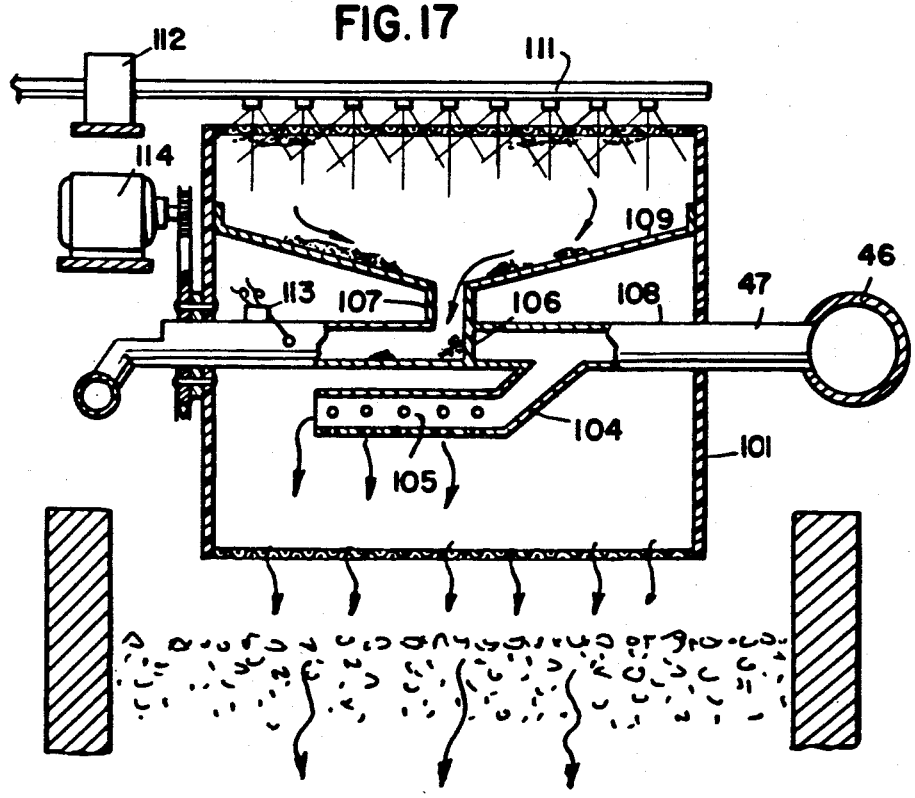

As above discussed, the particulate filter arrangement 61 is formed from a plurality of similar particulate filters 100, each of which receives medium to be filtered via the manifold 68 connected to the output of the pump 62. The filters 100 filter particulate matter from the medium passing therethrough and operate on a backwash principle. As shown in FIGS. 15 through 17, each of the filters 100 is in the form of a cylindrical drum having opposite flat ends 101 comprised of a stiff material such as, for example, plexiglass. A plurality of support ribs 102 extend between the drum ends and support a layer of fine mesh net 103. The net 103 forms the cylindrical sidewalls of the drum and its ends are also attached to the drum ends. Extending centrally through the drum and rotatably mounted relative thereto is a conduit 108 whose input end forms one of the inputs 69 connected to the manifold 68. In the interior of the drum, a feed pipe 104 having an apertured end 105 branched off in a downward direction from the central conduit 108 and couples medium entering the drum input 69 to the lower portion of the drum. Slightly downstream from the feed pipe 104, the conduit 108 is blocked by a wall 106 beyond which a further feed pipe 107 extends upwardly toward the top portion of the drum. The feed pipe 107 couples filtered matter to the output end 119 of the conduit 108 which, in turn, is connected to a collector pipe (not shown) for carrying the matter out of the filtration area. The filtered matter is fed to the feed pipe 107 from a tray 109 located in the upper portion of the drum and having slanted side walls which lead to the pipe 107. The tray 109 receives this matter from the upper mesh portions of the drum when the matter is dislodged by the action of water sprayed from a spray bar 111 situated above the drum and extending along its length. Water is controllably fed to the spray bar 111 through a solenoid valve 112 which is coupled to a water source (not shown).

A float switch 113 supported on the central conduit 108 provides actuation of the solenoid valve 112 as well as a motor 114 provided for rotating the drum relative to the conduit 108 and the tray 109. The motor 114 drives a first sprocket wheel 115, which, in turn, drives via a chain 116, a second sprocket wheel 117 whose hub is connected to the drum end wall 101.

In operation, when the particulate matter filtered by the interior of the lower portion of the mesh of the drum builds up to a point where the medium 15 in the drum rises to a level at which it activates the float switch 113, the switch 113 then actuates the motor 114 and solenoid valve 112. This, in turn, causes the drum to rotate so that a clean section of mesh is now situated at the lower portion of the drum. Simultaneously, a clogged section of mesh at the upper portion of the drum is brought under the spray now being delivered from the spray bar 111. These actions cause the medium level in the drum to decrease and the particulate matter dislodged by the spray from the interior of the mesh to fall into the tray 109 and be carried out of the system. This will continued until the medium level in the drum decreases to a point where the float switch 113 is no longer activated. At this time, the motor 114 and solenoid 112 turn off and the medium passes through the mesh net until the interior of the net becomes sufficiently clogged to allow the medium to build to a level where it again activates the switch 113.

The particulate filters 100 thus remove a significant amount of particulate debris from the medium 15 being delivered by the pump 62 as the medium passes downward through the filters into the bio-filter section 56. As shown, the latter section encompasses a large enclosed area of the tank 55. This area is filled with a layer of coral rock gravel 76 which is impregnated with nitrification bacteria. Passage of the medium 15 through the bio-filter thus results in removal of a significant amount of metabolic wastes.

As noted previously, below the gravel 76 in the bio-filter area 56 are disposed apertured pipes 70 for receiving the medium after it has passed through the filter. These pipes carry the medium to the collector pipe 71 which leads the medium through the aperture 73 in the wall 72 separating the foam fractionator section 57 from the bio-filter section 56.

As above-indicated, the foam fractionator section 57 includes four foam fractionators 81, each of similar construction, for removing further contaminants and, in particular, large organic molecules, such as proteins, from the introduced medium from the pipe 71. As shown in FIGS. 14, 15, 18 and 19, each fractionator 81 comprises a pipe 82 having helical indentations 82a along its length and apertures 83 at its upper end for receiving the introduced medium. A cylindrical collector or funnel 84 is supported centrally within the pipe 82 and extends downwardly past the apertures 83. At the lower end of the pipe 82, an apertured annular bar 85 is provided for introducing air to the downwardly flowing medium. The bar 85 receives air from an air line 86 coupled to an air source (not shown).

As can be appreciated, the medium flowing into the fractionator section 57 rises to the height of apertures 83 in the pipes 82 of the fractionator 81, thereby causing medium to descend down through each pipe. The air introduced from the respective bars 85, in turn, causes bubbles to ascend upwardly through each pipe. These ascending bubbles interact with the descending medium causing large organic molecules to be stripped therefrom. The bubbles with the attached organic molecules then continue their upward ascent and are collected by the respective collectors 84. The collected material in the collectors is then conveyed out of the system by the lines 87 and discarded.

The foam fractionators 81 thus remove further waste material from the medium 15, which, after reaching the bottom of the fractionator section 57, is coupled by the pipe 74 to the carbon filter section 58. This section includes a plurality of hollow substrates 91 which are filled with carbon. The hollow substrates 91 are slidably retained for easy removal and replacement between pairs of vertical channels 92 affixed to opposite walls of the carbon filter section 58. The medium passes from the pipe 74 through the substrates 91 and then enters the outlet section 60. The return pipe 75 then carries the filtered medium back into the rearing tanks 4A through 4C.

As can be appreciated, the combined effect of the particulate filters, bio-filters, foam fractionators and carbon filters of the present invention results in a significant amount of contaminants being extracted from the medium of the rearing tanks. As a result, the quality of the medium is maintained at a high level, thereby promoting growth and limiting mortality.

As previously noted, reliance solely on the energy provided by a single pump together with the force of gravity to induce flow through the filtration jump system just described results in a relatively low power requirement for that system. Nevertheless, an even further reduction in power consumption may be realized in the alternative filtration system illustrated in FIGS. 20 through 23. This alternative filtration system retains bio-filter, foam fractionator and carbon filter arrangements similar to those previously described while substituting different types of pumps and particulate filters.

Referring particularly to the drawings, FIGS. 20 and 21 show two overall views of the aforementioned alternative filtration system which, as indicated in FIG. 20, is located in an area 130 adjacent rearing tank 4C of the intensive culture unit of FIG. 1. The habitat structures of the rearing units are not shown in FIG. 20, but it should be understood that they would be positioned as shown in FIG. 1. The filtration area 130 is partitioned into an entry chamber 131, a bio-filter filtration section 132 and a fractionation chamber 133. Medium from rearing tank 4C as well as medium from rearing tanks 4A and 4B flowing into tank 4C through screened openings 65 and 66 (see FIG. 1) gains access to entry chamber 131 through an array of gate particulate filters 135 mounted in the wall of rearing tank 4C. As with the drum particulate filters earlier described, the gate particulate filters 135 are adapted to remove the particulate debris from the medium passing therethrough. The entry chamber is connected by conduits 150 and pipes 151 to the intake slots 152 of the two high volume pumps 153 (FIGS. 21 and 23).

As is indicated, conduits 150 run underneath the perforated floor 161 of bio-filter section 132 and pipes 151 extend vertically though and are surrounded by bio-filter bed 160. Each high volume pump includes a motor 154 which turns a propeller 155 mounted vertically on rotating shaft 156 of the motor. The motor and propeller assembly is mounted adjacent the tapered intake section 157a of housing 157 which includes intake slots 152 alluded to above. Medium constrained to enter the intake slots due to the presence of annular pipe cap 158 is sprayed upward by propeller 155 into the flared discharge section 157b of housing 157 which directs the spray radially outward to the higher fluid level of surrounding bio-filter area 132. Spraying the medium in this manner oxygenates the medium deposited in the bio-filter area. The action of the pumps also draws additional medium through pipes 151 and conduits 150 thereby lowering the level of entry chamber 131. The resulting difference in the fluid level of entry chamber 131 and rearing tank 4C induces the flow of medium from tank 4C through the array of gate particulate filters 135 to entry chamber 131. The high volume pumps thus draw a continuous flow of "used" medium from the rearing tanks through the gate particulate filters 132 and deposit the medium in bio-filter section 132 at a level higher than that of the rearing tanks. Thereafter, gravity induces flow through the remainder of the filter system and back to the rearing tanks.

More particularly, the medium descends through the bio-filter bed 160 composed of coral rock gravel or other appropriate substrate impregnated with nitrification bacteria and the perforated floor 161 of bio-filter section 132 to a collecting chamber 163. From the collecting chamber 163, the medium flows through opening 164 into fractionation chamber 133 where it passes through carbon filter panel 165. The carbon filter panel 165 is slidably mounted in grooves 166 formed in opposite walls of the fractionation chamber 133 and can thus be removed and replaced when necessary. After passing through the carbon filter panel, the medium then passes through the two foam fractionators 170 and is coupled therefrom back to the rearing tanks 4A through 4C via return conduit 180 which runs underneath the tanks.

FIGS. 21 and 22 illustrate the essential features and operation of gate particulate filters 135, which are adapted to handle a high volume flow rate with relatively little electrical power input. Like the drum particulate filters described earlier the gate particulate filters of the alternative filtration system operate as a backwash principle. Each gate particulate filter includes filter belt 136 made of a fine, preferably plastic, mesh material positioned around a series of four transporting rollers including a drive roller 137 and three driven rollers 138a, 138b and 138c. The drive roller 137 includes slots 139 across its length which accept the evenly spaced elongated teeth 140 located on the face of the belt 136. The drive roller is rotated in a counterclockwise direction by an electric motor 141.

All four rollers and the motor 141 are supported on a frame 142. A take-up mechanism (not shown) is provided in the frame for bottom roller 138c allowing the tension of the belt 136 to be adjusted. The frame 142 is slidably mounted between vertical tracks (not shown) attached to the sides of the tank wall. Each of the gate particulate filters thus forms a unit which can be removed for repair or replacement. The frame 142 includes an open grate 143 which provides support for the belt 136 against the flow of medium into entry chamber 131. Also mounted within the frame 142 is a spray bar 144 which directs a water spray at the filter belt as it passes underneath thereby dislodging particulate matter therefrom. The backwash spray and the debris dislodged from the filter belt is collected in a trough 145 and delivered to a collector pipe 146 which carries it out of the filtration system. This collected sewage may be used as feed for certain varieties of fine such as tilapia when such fish are to be reared in the intensive culture unit of the invention.

The actuation of spray bar 144 and drive motor 141 is controlled by a float switch 147 located in entry chamber 131 and mounted on the wall separating entry chamber 131 from bio-filter section 132. The switch is in the open position when the level of the medium in the entry chamber 131 approaches that of rearing tank 4C due to the relatively free passage of medium through the mesh of filter belt 136. As particulate debris builds up on the mesh and restricts the flow of medium therethrough, the medium level in entry chamber 131 is lowered and float switch 147 closes, activating drive motor 141 and spray bar 144. The motor pulls clogged sections of the mesh belt under the spray bar for cleaning as previously described while simultaneously bringing clean sections of the belt into contact with the medium in rearing tank 4C. Relatively free flow is thereby reestablished, raising the level in entry chamber 131 and re-opening float switch 147 to deactivate drive motor 141 and spray bar 144.

As previously indicated, the fractionation chamber 133 includes two essentially identical foam fractionators 170. These foam fractionators remove contaminants, particularly large organic molecules such as proteins, from the medium in substantially the same manner as the foam fractionators of the filtration system described earlier. As shown in FIGS. 21 and 23, each of the foam fractionators 170 comprises a standing pipe 171 whose upper end receives medium after its passage through carbon filter panel 165 and whose lower end is coupled to return conduit 180. As with the foam fractionators previously described, a downwardly extending funnel 172 is supported centrally within the pipe 171 and an apertured annular bar 173 is provided for introducing air bubbles to the medium descending through the pipe 171 to return conduit 180. The bar 173 receives air from an air line 174 which is coupled to an air source (not shown). As hereinbefore noted, the air bubbles rising through the descending column of medium in the pipe 171 strip large organic molecules from the medium. The bubbles then continue their ascent and are collected within funnel 172. The material thus collected in the funnel is conveyed out of the system by line 175 and discarded.

A further cleaning operation can also be carried out to aid either of the above-described filtration systems in maintaining the medium quality. This cleaning operation results in cleaning the bottom walls of the rearing tanks along which debris which cannot be effectively filtered is gathered. More particularly, a conventional automatic pool cleaner, suitably modified, is inserted into each tank after the substrate units have been raised from the medium. This robot scrapes the tank bottom and any accumulated detritus material is removed and carried out of the rearing building by suitable piping.

In order to facilitate the transferring of the shrimp in the illustrative intensive culture unit from the rearing unit 2A to the unit 2B and from the rearing unit 2B to the unit 2C and to facilitate the removal of adult shrimp from rearing unit 2C, a similar culling apparatus is provided in each of the rearing tanks 4A, 4B and 4C. This apparatus permits selection of the shrimp who have reached the desired stage of growth or development to be transferred to or removed from their respective rearing tank quickly and efficiently. More specifically, as illustrated in FIGS. 24 through 27, each tank is provided with a slotted track 181 which extends substantially around the periphery of its four walls and whose ends terminate adjacent an elongated opening 182 in the wall of the tank adjacent the next tank. Opening 182 is closed by a screen 183 which is slidably mounted in vertical tracks 211 affixed to the tank wall. Opening 182 in the tank depicted in FIGS. 24 and 25 corresponds to screened openings 65 and 66 in FIG. 1. The track 181 provides a guide means for a net structure 184 whose ends are moved in opposite directions so as to provide an enclosed area 210 including the screened opening 182.

More specifically, the net structure 184 comprises two similar elongated hollow bars 185 and 186 each of which is provided with a guide structure 187 at its upper end. The guide structure comprises two horizontal rails 188 and 189 which are crossed by two vertical rails 191 and 192. The upper horizontal rail 189 carries at its opposite ends horizontally oriented rollers 193 and 194. The lower horizontal rail 188 also carries at its opposite ends rollers 195 and 196, these rollers being oriented vertically. Inboard of the rollers 195 and 196, the rail 188 supports two wheels 197 and 198 arranged with their axes vertical. Two further wheels 199 and 201 having horizontal axes are connected via bars 202 and 203 to the lower ends of the vertical rails 191 and 192.

Inserted in each of the hollow bars 185 and 186 is a tubular plastic member 204. The members 204 support opposite ends of a mesh net 205. The net 205, in turn, passes through vertical slots 206 in the bars 185 and 186 and its draw strings are gathered together at a common point above the top end of one of the bars. The net 185 is further provided with leads 208 and floats 209 which maintain the net in a vertically stretched condition.

In operation, the net structure 184 is placed in a respective tank with the wheels 197 and 198 of the guide structures 187 of the bars 185 and 186 inserted in the track slot. The rollers 195 and 196 and the wheels 199 and 201 of the guides, in turn, engage the upper and lower walls of the track to prevent tilting. The two bars 185 and 186 are then moved in opposite directions until each arrives at an end of the screened opening 182 in the tank wall. During such movement, the wheels 193 and 194 of the guide structures ride on the inner wall of the tank to further guide the net structure. With the two bars 185 and 186 adjacent the ends of the opening 182, the net 205 now forms the enclosed area 210, which area includes the opening 182 and surrounds substantially all the shrimp in the tank. The draw strings of the net 205 are then pulled, allowing those shrimp who are smaller than the openings in the net to escape. The aforesaid openings are selected to be approximately equal in size (i.e., about 10 percent smaller) than the size of shrimp who have undergone the stage of development associated with the particular rearing tank. As a result, the shrimp who remain trapped in the localized area 210 surrounding the opening 182 are those who have substantially undergone the desired degree of growth. The screen 183 closing the opening is then slid upward and the aforesaid trapped shrimp move through the opening. If the tank in which the net structure is placed in either one of the rearing tanks 4A or 4B, the shrimp are transferred to the subsequent rearing tank, either the tank 4B or 4C. If, on the otherhand, the tank is the last rearing tank 4C, then the shrimp enter a harvesting container and are removed from the system.

The culling apparatus just described can be adapted for culling aquatic animals other than shrimp by simply replacing net 205 with a net of either smaller or larger mesh size, depending on the animals being reared in the rearing units. For polyculture applications, it may be advantageous to cull the larger species first with a net of relatively large mesh size and then cull the smaller species with nets of relatively small mesh size.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A particulate filter for use in a system for rearing aquatic animals having at least one rearing means including a tank containing a medium, and a filtration system, said tank and said filtration system having a common wall, said particulate filter comprising:

an endless belt formed of material which is substantially permeable to said medium and substantially impermeable to particulate matter, whereby particulate matter is collecting on the surface of said belt immediately contacting said medium when said medium passes through said belt, said belt having a first surface with evenly spaced elongated teeth secured thereto and a substantially smooth second surface opposite said first surface;

means for positioning and transporting said belt comprising a drive roller having a plurality of lengthwise slots for engaging said elongated teeth, and at least one driven roller disposed to contact said second surface;

means for driving said positioning and transporting means;

means for dislodging from the surface of said belt the particulate matter collected thereon;

means for housing said positioning and transporting means, said driving means and said dislodging means, said housing means being slidably and removably mounted in said common wall between said tank and said filtration system;

means for receiving particulate matter dislodged from said belt; and means responsive to the medium level immediately downstream of the particulate filter for actuating said driving means and said dislodging means.

2. A particulate filter in accordance with claim 1 wherein
said driving means comprises a motor.

3. A particulate filter in accordance with claim 1 wherein said dislodging means comprises a spray bar for directing a fluid spray at said belt.

4. A particulate filter in accordance with claim 3 wherein said housing means comprises a frame and said frame includes an open grate for supporting said belt against the force of the medium flowing therethrough.

5. A particulate filter in accordance with claim 4 wherein said receiving means comprises a trough.

6. A particulate filter in accordance with claim 5, said particulate filter further comprising means coupled to said trough for conveying particulate matter collected in said trough away from said particulate filter.

7. A particulate filter in accordance with claim 6 wherein said conveying means comprises a pipe.

8. A particulate filter in accordance with claim 7 wherein said actuating means comprises a float switch disposed in the medium downstream of said particulate filter.

* * * * *